United States Patent
Valente et al.

(10) Patent No.: US 6,779,120 B1
(45) Date of Patent: Aug. 17, 2004

(54) DECLARATIVE LANGUAGE FOR SPECIFYING A SECURITY POLICY

(75) Inventors: Luis Filipe Pereira Valente, Palo Alto, CA (US); Geoffrey Howard Cooper, Palo Alto, CA (US); Robert Allen Shaw, Los Altos, CA (US); Kieran Gerard Sherlock, Palo Alto, CA (US)

(73) Assignee: Securify, Inc., Mountain View, CA (US)

( * ) Notice: Subject to any disclaimer, the term of this patent is extended or adjusted under 35 U.S.C. 154(b) by 0 days.

(21) Appl. No.: 09/479,781

(22) Filed: Jan. 7, 2000

(51) Int. Cl.[7] .......................................... G06F 13/364
(52) U.S. Cl. ....................................... 713/201; 717/117
(58) Field of Search ............................... 713/201, 200, 713/151, 154; 717/140, 120, 117

(56) References Cited

U.S. PATENT DOCUMENTS

| | | | |
|---|---|---|---|
| 5,805,899 A | * | 9/1998 | Evans et al. ................ 717/170 |
| 6,158,010 A | * | 12/2000 | Moriconi et al. ........... 713/201 |
| 6,292,900 B1 | * | 9/2001 | Ngo et al. .................. 713/200 |
| 6,484,261 B1 | * | 11/2002 | Wiegel ....................... 713/201 |
| 6,505,192 B1 | * | 1/2003 | Godwin et al. ............... 707/3 |
| 6,519,767 B1 | * | 2/2003 | Carter et al. ................ 717/140 |

* cited by examiner

Primary Examiner—Gregory Morse
Assistant Examiner—Andrew Nalven
(74) Attorney, Agent, or Firm—Glenn Patent Group; Michael A. Glenn

(57) ABSTRACT

The invention is a declarative language system and comprises a language as a tool for expressing network security policy in a formalized way. It allows the specification of security policy across a wide variety of networking layers and protocols. Using the language, a security administrator assigns a disposition to each and every network event that can occur in a data communications network. The event's disposition determines whether the event is allowed (i.e. conforms to the specified policy) or disallowed and what action, if any, should be taken by a system monitor in response to that event. Possible actions include, for example, logging the information into a database, notifying a human operator, and disrupting the offending network traffic.

9 Claims, 3 Drawing Sheets

DECLARATIVE LANGUAGE FOR SPECIFYING A SECURITY POLICY

BACKGROUND OF THE INVENTION

1. Technical Field

The invention relates to security and network services. More particularly, the invention relates to a declarative language system used in defining policy for an entire network and in providing monitoring and enforcing of computer network security.

2. Description of the Prior Art

Security administrators need tools that help them formulate their site security policy and translate it into monitoring and enforcement mechanisms. They need to be sure that the computer enforced policy—often cobbled together from a plethora of disjoint access control mechanisms—matches their enterprise policy, all too often specified in a loose natural language or a set of unwritten principles. This leads to confusion as to why access is being granted or denied to particular resources and may lead to unintentional breaches of security.

A way to reduce or eliminate the confusion described above is by providing a user-friendly and, yet, rigorous way of specifying security policy, as well as providing tools for monitoring and enforcing the security policy.

Blaze, Feigenbaum, and Lacy (BFL), *Decentralized Trust Management*, Proc. IEEE Conference on Security and Privacy (1996), used the term trust management to refer to a problem of deciding whether requested actions, supported by credentials, conform to policies. In other words, it deals with the questions of who, how, and what. Who (the principals, for example, people, computers and organizations) can access what (the resources being sought) and how (the actions performed against the target resources).

Mansouri-Samani, et al, GEM: *A Generalized Monitoring Language for Distributed Systems*, Distributed Systems Engineering, vol.4, no. 2 96–108 (June 1997) discloses a generalized-event monitoring notation that permits user-specified filtering and composition scripts to be dynamically loaded into distributed-event monitoring components. GEM uses "scheduled time events and default or user-defined detection windows" to cope with "variable communication delay problems." The GEM event monitoring system is used "to detect complex event sequences and to convert these into simple events" that trigger management actions. The event monitors have been restricted to performing "very simple activities related to triggering or notifying events."

J. A. Grompone, *A Declarative Language for the Configuration of Exchanges*, Telecommunications Journal, vol. 56, no.1 (January 1989) discloses the design and implementation of a high-level language, LEP, to define the routing and customizing of rules of a telex exchange. The routing concepts are basic and few in number. Each of the physical communication paths is called a line. The lines are arranged in groups. The purpose of the LEP language is to provide a comprehensive definition of all lines of an exchange, the arrangement of these lines in groups and the physical attributes of the groups. All groups taken together comprise all the lines without any lines missing or being repeated. A group is an ordered set of lines. The LEP term "access" is used to denote whether lines are permitted or forbidden to access other lines or services. Routing, a basic objective of an LEP program, is a way of associating sets of compiled codes with destinations, done through a sequence of elementary declarations. LEP also defines the possible destinations of a call. One of the main design concepts was to use a very simple structure for the declarations for even users unfamiliar with computer programming.

The LEP language cannot thread together multiple protocol layers of a network event. The LEP language lacks the sophistication in terms of richer expressions to allow a set of policy rules affecting different networking protocols to be applied to a complex protocol interaction between two communicating parties, and to security policy for an entire network. The LEP language does not suggest defining allowed traffic patterns and handling those events that deviate from those patterns.

Plasek, et al, Statistical Database Query Using Random Sampling Of Records, U.S. Pat. No. 5,878,426, discloses a method for obtaining decision support query results from a database table having multiple records. An attribute of the database table is sampled, which results in a collection of sampled data. The sampled data represents some percentage of all of the data corresponding to that attribute in the database table. The data associated with the attribute includes multiple data classes, and the sampled data is separated or partitioned into these data classes. A database query is applied to the sampled data rather than to all of the data corresponding to that attribute in the database table.

Plasek, et al, also discloses a method to obtain decision support query results from a database table where all of the data associated with a particular database attribute is grouped into various data classes. Each of the data classes is individually randomly sampled to obtain a corresponding number of class data samples. Each of the class data samples is then queried, which can include executing aggregation functions on each of the class data samples.

Plasek, et al, also discloses a method for providing result approximations in database queries.

Plasek, et al, does not disclose nor suggest providing a method to select a most specific and applicable result or policy rule. Plasek, et al, does not disclose nor suggest providing a method to rank data and does not order data in a database beyond partitioning data into classes and thereafter randomly sampling each data class such that database queries are applied to each of the samples.

Plasek, et al, does not disclose nor suggest providing a ,method to thread protocol layers of a network event together to provide a result to the network event.

Chow, et al, System, Method, and Program for Extending a SQL Compiler for Handling Control Statements Packaged with SQL Query Statements, U.S. Pat. No. 5,875,334 (Feb. 23, 1999) discloses an integrated compiler for compiling SQL3 control statements having procedural, i.e., control, information packaged together with query, i.e., non-procedural, statements. A query extractor contained within the parser extracts the query statement from the control statement leaving a control skeleton. The query statement is processed as usual through a query compiler for generating executable plans with the exception that the name resolution function for resolving variables is modified for looking up local variables. This modification takes into account the mapping of local and host variables to create a unification of local and host variables. The control skeleton is processed through a control analyzer which generates a representation of the control flow and a scope and symbol table. The control analyzer also unifies the local and host variables. A plan synthesizer then takes as input the control flow information, symbol tables, and individual executable plans for the query statements and generates a meta-plan comprising a merger of a top level plan for the control skeleton and sub-plans representing the executable plans of the query statement.

Chow, et al, does not disclose nor suggest a ranking method or an ordering method to handle a set of rules to be applied to a complex protocol interaction between two communicating parties.

Nor does Chow, et al, disclose or suggest a method whereby to thread protocol layers of a network event together to provide a rule applicable to the network event.

V. Paxson, *Bro: A System for Detecting Network Intruders in Real-Time*, Network Research Group, Lawrence Berkeley National Laboratory, Berkeley, Calif., LBNL-41197 (January 1998) discloses a stand-alone system for detecting network intruders in real-time by passively monitoring a network link over which the intruder's traffic transits. The system comprises a "policy script interpreter" that interprets event handlers written in a specialized language used to express a site's security policy. The specialized language is C-style because it comprises, for example, C-style data types and constants, operators, and block statements and is procedural. Bro comprises first-class values and aggregate types such as record and table, used to specify a security policy.

However, Paxson does not disclose nor suggest providing a sophisticated ranking method to rank policy rules according to the specificity of the initiator and target communicating hosts and to select a most applicable rule in an efficient manner. Paxson does not disclose nor suggest providing a method to thread protocol layers of a network event together to provide a result to the entire network event.

It would be advantageous to reduce or eliminate the confusion described herein above by providing a user-friendly and, yet, rigorous way of specifying security policy, as well as providing tools for monitoring and enforcing the security policy.

It would be advantageous to have a trust manager that takes as its input a security policy defined as a set of policy rules (statements about trust) and a set of credentials (statements about principals), such that it is capable of processing requests for trust decisions, i.e. evaluating compliance with the policy.

It would be advantageous for the trust manager to have a unified view of an interaction between two principals across a stack of protocol layers, each governed by discreet policy rules, and to apply a final trust decision based on which of these policy rules better fits the entire interaction. For example, using HTTPS to access a secure web page involves an interaction between two network addressable machines (at the TCP/IP level), an interaction between a cryptographically authenticated server and, possibly, a cryptographically authenticated client (at the SSL level), and an interaction between a Web browser (possibly with its own authentication credentials) and a web server, resulting in the retrieval of a web page (at the HTTP level).

It would be advantageous to have a policy definition language as well as well-designed algorithms to support monitoring and auditing network activity, in addition to traditional access/deny authorization decisions. For example, a policy rule might instruct a monitoring Agent to log all traffic between two computers or to decrypt a secure channel between two users.

It would be advantageous to provide a system that comprises a passive monitor of network traffic that does not need to be installed on target hosts or integrated into existing applications.

It would be advantageous to provide a system that uses a sophisticated algorithm for determining which policy rules take precedence over others.

It would be advantageous to provide a policy language that allows a set of policy rules affecting different networking protocols to be applied to a complex protocol interaction between two communicating parties. Also, it would be advantageous to use the policy language to express security policy for an entire network.

It would be advantageous to provide a system, unlike current Intrusion Detection Systems (IDS) which only look for signatures of known attacks, focusing on defining allowed traffic patterns and determining how to handle events that deviate from those patterns.

SUMMARY OF THE INVENTION

The invention is a declarative language system and comprises a language as a tool for expressing network security policy in a formalized way. It allows the specification of security policy across a wide variety of networking layers and protocols. Using the language, a security administrator assigns a disposition to each and every network event that can occur in a data communications network. The event's disposition determines whether the event is allowed (i.e. conforms to the specified policy) or disallowed and what action, if any, should be taken by a system monitor in response to that event. Possible actions include, for example, logging the information into a database, notifying a human operator, and disrupting the offending network traffic.

The language is implemented by a Policy Engine, a component also of a Security Policy Monitoring (SPM) system. The SPM system, also referred to herein as the Policy Monitoring System, is ideally suited for network and security assessments where real network traffic is analyzed in order to identify abnormal traffic patterns, system vulnerabilities and incorrect configuration of computer systems on the network.

Unlike other trust management systems, the SPM is designed to be a passive monitor of network traffic. As such, it need not be installed on target hosts or integrated into existing applications.

The invention provides a simple and intuitive model for expressing and applying security policies. The language is much richer in terms of what it can express than languages used in firewalls and routers. It uses a sophisticated, algorithm for determining which policy rules take precedence over others, a process that in other systems is completely manual.

Unlike existing firewalls and routers, the invention allows a set of policy rules affecting different networking protocols to be applied as a whole to a complex protocol interaction between two communicating parties. Furthermore, networking equipment typically handles only policy related to the network traffic that flows through it. Using the invention herein one can express the security policy for an entire network.

Unlike IDS systems, which look for the signatures of known attacks, the SPM is focused on defining allowed traffic patterns and how to handle events that deviate from those patterns.

DETAILED DESCRIPTION OF THE INVENTION

Overview

Figure 1:
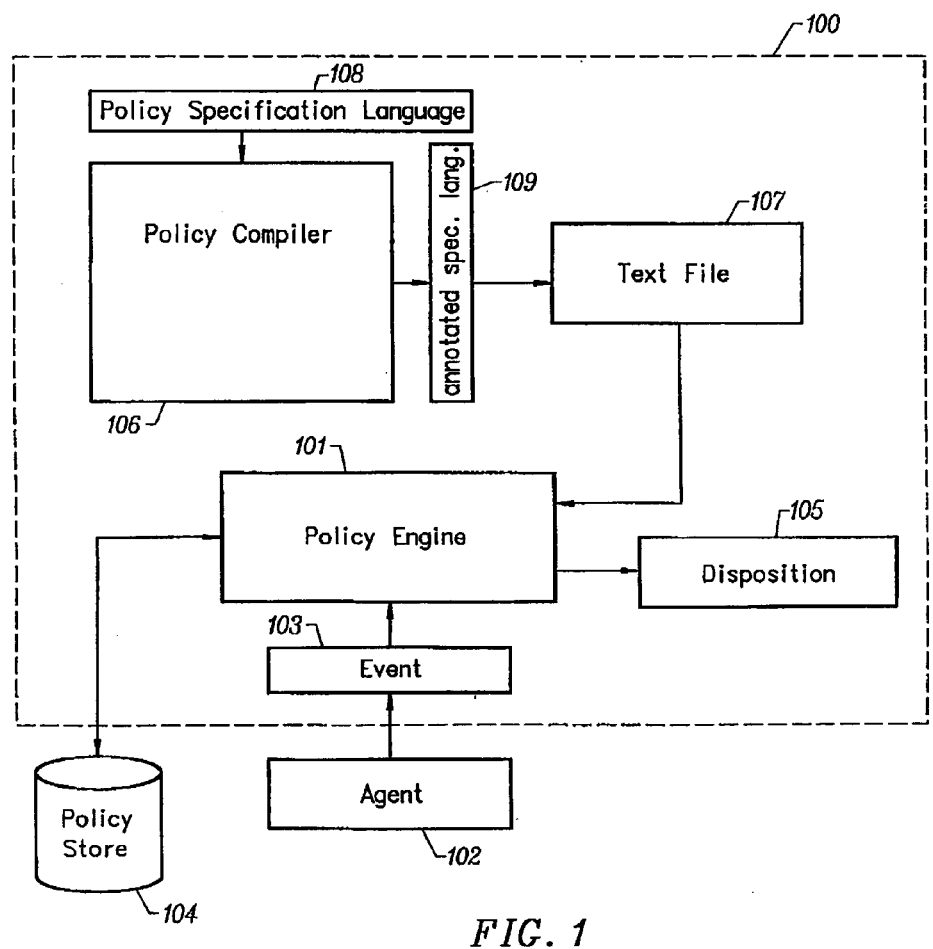
FIG. 1 is a schematic diagram showing the relationship of elements of the Policy Monitoring System, according to the invention.

FIG. 1 is a schematic diagram showing the relationship of elements of the Policy Monitoring System 100, according to the preferred embodiment of the invention. To effect a security policy decision, a policy manager module invokes a Policy Engine 101 with both a reference to a pre-defined security policy and a number of inputs it received from an Agent 102. These inputs describe a protocol event such as a TCP connection, an SSL session, or an HTTP GET. The end to end interaction between two communicating entities comprises one or more protocol events and it is termed a network event 103. For example, the retrieval of a web page from a web server by a web browser is a network event that typically consists of an IP protocol event, a TCP protocol event and an HTTP protocol event.

In the preferred embodiment the Policy Engine 101 consults a policy information database, a Policy Store 104 to determine a policy rule that applies to the network event 103. In the preferred embodiment the Policy Engine 101 collects input from the Agent 102 about each protocol event until it has enough information to consult the Policy Store 104. Once an applicable policy rule for the entire network event 103 has been found, the Policy Engine 101 returns a disposition 105 for the event to the policy manager module which in turn forwards it to the Agent 102, to a logging subsystem and, optionally, to an enforcement subsystem.

Figure 2:
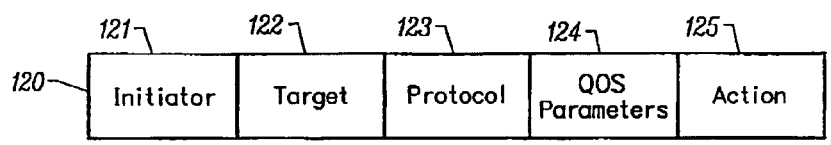
FIG. 2 is a schematic diagram of a protocol event according to the invention.

A definition of a protocol event is provided to facilitate understanding of the invention. A protocol event 120 as shown in FIG. 2 comprises the following elements:

1) The Principals. Every policy decision involves two principals: an initiator 121 (an active principal) and a target 122 (a passive principal). Principals are identified by a set of one or more credentials, depending on how much information is known about them and what protocol service they are using. There are three types of credentials:

a) Host credentials. These are the physical network address, i.e. a MAC address, and the network attachment point, e.g. an IP address and port number.

b) User credentials. These may be weak credentials, e.g. a user name and password, or strong credentials, e.g. an X.509 certificate.

c) Object credentials. These identify a resource or an application, e.g. a URL or a pathname.

2) The Protocol. The protocol service 123 associated with this protocol event 120.

3) The Security Quality of Service Parameters. Some protocols include security QOS parameters 124 and these may be subject to local security policy constraints. For example, in the SSL protocol the ciphersuite negotiated between the SSL client and the SSL server is a security QOS parameter.

4) The Action. Every interaction between an initiator and a target over a given protocol service involves a specific action 125. Clearly, not all actions are of interest to the policy manager module. For example, in the SSL protocol only actions pertaining to the establishment or termination of an SSL session, most notably, the negotiation of security parameters for the session are of interest. In the LDAP protocol, on the other hand, a security policy administrator may wish to express policy statements about different LDAP data manipulation operations, such as, the SEARCH and MODIFY operations.

In one embodiment of the invention, while processing a network event 103, and before issuing a final ruling, the Policy Engine 101 may instruct the Agent 102 to carry out specific actions against the network event 103. For example, the Agent 102 may be asked to decrypt subsequent SSL traffic or it may be asked to impose a specific ciphersuite on the target system. These instructions constitute an intermediate output of the Policy Engine 101 and are issued in the form of agent directives, defined herein below.

Figure 3:
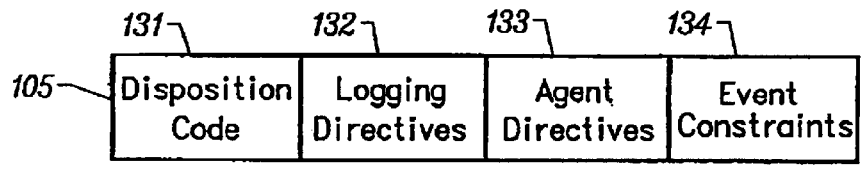
FIG. 3 is a schematic diagram of a disposition according to the invention.

Once the Policy Engine 101 arrives at a final policy decision, it produces a disposition 105 for the event 103. The disposition 105 as shown in FIG. 3 comprises the following elements:

1) Disposition Code. The disposition code 131 denotes whether or not the event 103 complies with the security policy and, if not, identifies the specific policy violation. A list of possible codes in a preferred embodiment is given in Table A herein below. This field is mandatory.

2) Logging Directives. The logging directives field 132 includes a severity code, denoting the severity of the policy violation. A list of possible severity values in a preferred embodiment is given herein below in Table B. The severity code may be used by a logging subsystem to filter the event 103 and its disposition 105 or to control a notification action, e.g. page a network operator. In another embodiment the logging directives 132 may also include an optional human readable description summarizing the specific policy that determined the final disposition 105 e.g. "blue users cannot access the red server". The logging directives field 132 is mandatory if the disposition code 131 indicates a policy violation.

3) Agent Directives. Agent directives 102 are any instructions that need to be communicated to the Agent 102 and in another embodiment to more than one Agent. For example, the Agent 133 may be instructed to log all traffic associated with the event 103 or to disrupt communications between the initiator 121 and the target 122. In some embodiments, an Agent 102 only supports monitoring functions, or only enforcement functions, or be limited in its support of other types of functions. In, a preferred embodiment, a policy manager is responsible for distributing a set of directives to appropriate Agents.

4) Event Constraints. Event constraints 134 are any constraints to be applied to the event 103. For example, in one embodiment these constraints are protocol-specific constraints such as the maximum lifetime of a TCP connection or the maximum lifetime of an SSL session. In another embodiment, these constraints are communicated to the Agent reporting the event or simply to a policy manager.

TABLE A

Built-in Objects

The following is a set of built-in language objects known to both the policy compiler and the policy engine.
First the built-in groups. It should be noted that, unlike user-defined groups, built-in groups cannot be extended in a policy specification.
// List of supported protocols
( group all-protocols    protocol_t
    ( union IP UDP ICMP TCP SSL HTTP )
    // NOTE: new protocols can be added as needed
)

TABLE A-continued

Built-in Objects

```
// List of supported hash algorithms
( group hash-algorithms    hash_alg_t
    ( union MD5 SHA1 )
)
// List of supported agent directives
( group agent-directives   agent_directive_t
    ( union DECRYPT DISRUPT LOG_TRAFFIC )
)
// List of supported logging severity codes
( group severity-codes    severity_t
    ( union CRITICAL HIGH MEDIUM WARNING MONITOR
      INFORMATION )
)
// List of supported disposition codes
( group disposition-codes   code_t
    ( union OK CONTINUE ACCESS_DENIED
      AUTHENTICATION_VIOLATION
        SECURITY_ATTACK SECURITY_QOS POLICY_
        ERROR )
)
// Certificate status values for valid certificates
( group valid-certs cert_status_t
    ( union    VALID )
)
// Certificate status values for certificates rendered invalid
( group invalid-certs cert_status_t
    ( union EXPIRED NOT_YET_VALID REVOKED SUSPENDED )
)
// Certificate status values for rejected certificates
( group rejected-certs cert_status_t
    ( union    MALFORMED UNSUPPORTED_CRITICAL_
      EXTENSION )
)
// Certificate status values for all bad certificates
( group bad-certs cert_status_t
    ( union    rejected-certs invalid-certs
)
// List of all possible certificate status values
( group cert-status-values    cert_status_t
    ( union    valid-certs invalid-certs rejected-certs )
)
// List of all possible authentication status values
( group auth-status-values    auth_status_t
    ( union SUCCEEDED REJECTED ABORTED )
)
// List of all SSL ciphersuites
( group ssl-ciphersuites ciphersuite_t
    ( union    SSL_RSA_WITH_NULL_MD5
      SSL_RSA_WITH_NULL_SHA
      SSL_RSA_EXPORT_WITH_RC4_40_MD5
      SSL_RSA_EXPORT_WITH_RC2_CBC_40_MD5
      SSL_RSA_EXPORT_WITH_DES40_CBC_SHA
      SSL_RSA_WITH_RC4_128_MD5
      SSL_RSA_WITH_RC4_128_SHA
      SSL_RSA_WITH_IDEA_CBC_SHA
      SSL_RSA_WITH_DES_CBC_SHA
      SSL_RSA_WITH_3DES_EDE_CBC_SHA
      SSL_DH_RSA_WITH_3DES_EDE_CBC_SHA
      SSL_DH_DSS_WITH_3DES_EDE_CBC_SHA
      SSL_DH_RSA_WITH_DES_CBC_SHA
      SSL_DH_DSS_WITH_DES_CBC_SHA
      SSL_DH_RSA_EXPORT_WITH_DES40_CBC_SHA
      SSL_DH_DSS_EXPORT_WITH_DES40_CBC_SHA
      SSL_DH_ANON_EXPORT_WITH_RC4_40_MD5
      SSL_DH_ANON_WITH_RC4 _128_MD5
      SSL_DH_ANON_EXPORT_WITH_DES40_
      CBC_SHA
      SSL_DH_ANON_WITH_DES_CBC_SHA
      SSL_DH_ANON_WITH_3DES_EDE_CBC_SHA
      SSL_DHE_RSA_WITH_3DES_EDE_CBC_SHA
      SSL_DHE_DSS_WITH_3DES_EDE_CBC_SHA
      SSL_DHE_RSA_EXPORT_WITH_DES40_
      CBC_SHA
      SSL_DHE_DSS_EXPORT_WITH_DES40_
      CBC_SHA
      SSL_DHE_RSA_WITH_DES_CBC_SHA
      SSL_DHE_DSS_WITH_DES_CBC_SHA
      SSL_FORTEZZA_KEA_WITH_NULL_SHA
      SSL_FORTEZZA_KEA_WITH_FORTEZZA_
      CBC_SHA
      SSL_FORTEZZA_KEA_WITH_RC4_128_SHA
      SSL_V2_RC4_128_WITH_MD5
      SSL_V2_RC4_128_EXPORT40_WITH_MD5
      SSL_V2_RC2_CBC_128_CBC_WITH_MD5
      SSL_V2_RC2_CBC_128_CBC_EXPORT40_
      WITH_MD5
      SSL_V2_IDEA_128_CBC_WITH_MD5
      SSL_V2_DES_64_CBC_WITH_MD5
      SSL_V2_DES_192_EDE3_CBC_WITH_MD5
    )
)
// List of supported action codes for TCP
( group tcp-action-codes    action_t
    ( union    CONNECT
               MISSED_CONNECT
               TIMEOUT
               ABORT
               CLOSE )
)
// List of supported action codes for UDP
( group udp-action-codes   action_t
    ASSOCIATION
)
// List of supported action codes for IP
( group ip-action-codes    action_t
    ASSOCIATION
)
// List of supported action codes for ICMP
( group icmp-action-codes   action_t
    ( union ASSOCIATION
            BAD_CODE
            FRAGMENTATION_NEEDED
            HOST_UNREACHABLE
            NETWORK_UNREACHABLE
            PORT_UNREACHABLE
            PROTOCOL_UNREACHABLE
            SOURCE_ROUTE_FAILED
            ECHO
            ECHO_REPLY
            INFORMATION_REQUEST
            INFORMATION_REPLY
            PARAMETER_PROBLEM
            REDIRECT_HOST
            REDIRECT_TYPE_OF_SERVICE_AND_HOST
            REDIRECT_NETWORK
            REDIRECT_TYPE_OF_SERVICE_AND_NETWORK
            SOURCE_QUENCH
            TIME_TO_LIVE_EXCEEDED
            REASSEMBLY_TIME_EXCEEDED
            TIMESTAMP
            TIMESTAMP_REPLY )
)
// List of supported action codes for SSL
( group ssl-action-codes    action_t
    ( union HANDSHAKE
            MISSED_HANDSHAKE
            SESSION_CLOSED
            SESSION_ABORTED
    )
// List of supported action codes for HTTP
( group http-action-codes   action_t
    ( union GET
            HEAD
            POST
            PUT
            DELETE
            OPTIONS
            TRACE
            CONNECT
            MISSED_REQUEST
            RESPONSE )
)
// List of all supported action codes
( group all-action-codes    action_t
```

TABLE A-continued

Built-in Objects

```
( union  udp-action-codes
        ip-action-codes
        icmp-action-codes
        tcp-action-codes
        ssl-action-codes
        http-action-codes )
)
```

Now, the dispositions and policy rules built into the Policy Engine. These rules can be overwritten by user-defined policy rules.

```
disposition ok
    ( code OK )
)
( disposition continue
    ( code CONTINUE )
)
( disposition policy-error
    ( description "Policy error caused by uncaught event" )
    ( code POLICY_ERROR )
    ( log-directive
        CRITICAL
        "Uncaught event" )
)
( rule default-rule
    ( description "Catch-all rule for all protocols" )
    ( protocol present )
    ( action present )
    ( initiator ignore )
    ( target ignore )
    ( outcome
        ( final
            ( default policy-error )
        )
    )
)
```

It is noted that the list of built-in objects included in Table A is by no means complete. In other embodiments, the set of built-in objects is expanded or reduced to reflect the set of protocols supported by the Policy Monitoring System.

It is noted that in the preferred embodiment the Policy Engine 101 ranks default-rule lower than any user-defined rule. For example, a user-defined rule having initiator and target credentials set to ignore ranks higher than using default-rule.

Figure 4:
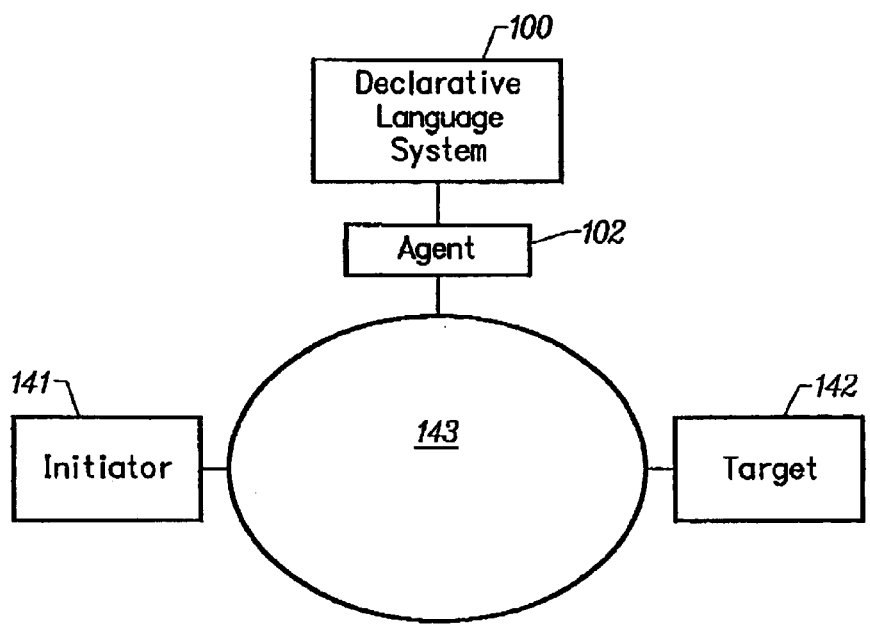
FIG. 4 is a schematic diagram of communicating parties according to the invention.

In a preferred embodiment, security policy decisions are also affected by any previous history of security violations involving one or both of the principals. FIG. 4 is a schematic diagram of communicating parties according to the invention; wherein an initiator host machine 141 attempts to contact a target host machine 142 over a network, and its events are listened to by an Agent 102 and events are passed onto the invention herein 100. For example, a host machine 141 that repeatedly attempts to perform an illegal operation within a given time window may be blacklisted and rendered incapable of conducting further communication activity within the security domain. In one embodiment, a policy manager maintains a count of security policy violations perpetrated by or against specific principals and provides that information to the Policy Engine 101 as input to a policy evaluation procedure.

Specification Language

A security policy is formulated using the Policy manager module's policy specification language (FIG. 1) 108. A preferred embodiment chooses a simplified form of S-expressions as the policy specification language 108. S-expressions are LISP-like parenthesized expressions. The preferred embodiment uses a variant of S-expressions devised by Ron Rivest in R. Rivest, *code and description of S-expressions*, http://theory.les.mit.edu/~rivest/sexp.html, and used in SPKI/SDSI in C. Ellison, *SPKI Certificate Documentation*, http://www.clark.net/pub/cme/html/spki.html. In the preferred embodiment the use of Rivest's S-expressions are restricted in a way such that no empty lists are allowed and such that each list must have a type (a byte string) as its first element, denoting the type of the object represented by the list. The use of Rivest's S-expressions is further restricted by only requiring support for the canonical and advanced representations of S-expressions, a preferred embodiment of which is depicted in Table B herein below.

An advantage of using the canonical representation of S-expressions in the preferred embodiment is for digital signature purposes as well as for relatively efficient communication. It is easy to parse, fairly compact, and is unique for any given S-expression. An advantage of using the advanced representation of S-expressions is for human consumption. It can be thought of as a pretty print of the canonical representation.

TABLE B

An example of an advanced representation:
    ( certificate ( issuer alice ) ( subject bob ) )
An example of a canonical representation:
    (11:certificate(6:issuer5:alice) (7:subject3:bob))

It should be noted that replacing language tokens (e.g. certificate, issuer) with minimally encoded identifiers further optimizes the canonical representation.

The main advantages of using S-expressions in the preferred embodiment are:

It is easy to represent arbitrary data with S-expressions.

S-expressions are easy to extend and modify.

In their advanced representation they are easy to read and edit using, for example, a simple text editor.

Their canonical representation was designed for efficient packing and parsing. In particular, parsing requires minimal look-ahead and no re-scanning.

Their canonical representation allows for easy transportation, for example, in files or email messages.

In their canonical encoding they can be digitally signed.

It is relatively simple to convert between the advanced and the canonical representation of S-expressions.

A formal description of the policy specification language 108 is provided herein below in Table C.

TABLE C

This table contains a Backus-Naur Form (BNF) description of the grammar for the policy specification language, including an annotation section. All valid policies derive from the <policy> production.
This grammar applies to the policy specification after all comments are removed and all macros are expanded. Comments begin with □//□ and extend to the end-of-line. Macros are defined using the C macro syntax.
Incomplete parts of the grammar are noted in *italics*.
Terminals are shown in bold.
//
// Basic language stuff
//
// Terminals requiring further syntax specification TABLE C-continued

```
              <integer> ::= TBD              // [0-9]*
              <symbol> ::= TBD               // alphanumeric and '-',
                                             // '_', starts with letter
              <string> ::= <concat> | TBD    // any ASCII character
                                             // enclosed in double-quotes
            <mac-addr> ::= TBD               // 6 hex byte values
                                             // separated by '-'
             <ip-addr> ::= TBD               // IPv4 dotted decimal
                                             // notation
             <ip-mask> ::= TBD               // address prefix per
                                             // RFC-2280
          <hex-string> ::= TBD               // n hex byte values
                                             // separated by ':'
      <version-string> ::= TBD               // a string of the form
                                             // <major>.<minor>
// Some productions used only for clarity
                <name> ::= <symbol>
                <type> ::= <symbol>
           <attr-name> ::= <symbol>
// The basic types in the language
                <atom> ::= <symbol> | <integer> | <string> |
                           <ip-addr> | <mac-addr> |
                           <version> | <hash-atom> | <bool>
//
// Productions for the policy specification section
//
// These are values that describe the values of things with values
          <meta-value> ::= present | absent | ignore
// Productions used in a few places
           <assertion> ::= ( assertion <bool-expr> )
// Version conversion function
             <version> ::= ( version <version-string> )
// Attributes, used as arguments in predicates and other operations
      <attr-part-list> ::= <atom> |
                           <attr-part-list> <atom>
             <attr-op> ::= ( <attr-name> <attr-part-list> )
           <attribute> ::= <attr-name> | <attr-op>
// Hashes
      <hash-alg-name> ::= [Some set of terminals of type hash_alg_t]
             <hash-op> ::= ( hash <hash-alg-name> <attribute> )
           <hash-atom> ::= <hex-string>
                <hash> ::= <hash-atom> | <hash-op>
// Operations that operate on attributes and return a
// basic type (atom)
            <atom-ops> ::= <hash-op>
// Predicates - used in building boolean expressions
   <generic-compare-op> ::= eq
       <num-compare-op> ::= gt | lt | ge | le
       <rng-compare-op> ::= range
    <string-compare-op> ::= prefix | substring
    <member-compare-op> ::= member
    <ipmask-compare-op> ::= ip-mask
     <iprng-compare-op> ::= ip-range
       <cred-match-op> ::= root | has
        <presence-op> ::= present | absent
// Generic argument
                 <arg> ::= <attribute> | <atom> | <atom-ops>
         <generic-cmp-arg> ::= <arg>
         <generic-compare> ::= ( <generic-compare-op>
                                 <generic-cmp-arg> <generic-cmp-arg> )
         <num-cmp-arg> ::= <attribute> | <integer> | <version>
         <num-compare> ::= ( <num-compare-op>
                             <num-cmp-arg> <num-cmp-arg> ) |
                           ( <rng-compare-op>
                             <num-cmp-arg>
                             <num-cmp-arg> <num-cmp-arg> )
      <string-cmp-arg> ::= <attribute> | <string>
      <string-compare> ::= ( <string-compare-op>
                             <string-cmp-arg> <string-cmp-arg> )
      <member-cmp-arg> ::= <arg>
     <member-part-list> ::= <member-cmp-arg> <union> |
                            <member-cmp-arg> <member-cmp-arg> )
      <member-compare> ::= ( <member-compare-op>
                             <member-part-list> )
      <ipmask-compare> ::= ( <ipmask-compare-op>
                             <attribute> <ip-mask> )
       <iprng-cmp-arg> ::= <attribute> | <ip-addr>
       <iprng-compare> ::= ( <iprng-compare-op>
                             <iprng-cmp-arg>
```

TABLE C-continued

```
                            <iprng-cmp-arg> <iprng-cmp-arg> )
         <cred-match> ::= ( <cred-match-op> <attribute>
                            <cred-name> )
           <presence> ::= ( <presence-op> <attribute> )
          <predicate> ::= <generic-compare> | <num-compare> |
                          <string-compare> | <member-compare> |
                          <ipmask-compare> | <iprng-compare> |
                          <cred-match> | <presence>
// Boolean expressions
        <bool-list-op> ::= and | or
     <bool-monadic-op> ::= not
               <bool> ::= TRUE | FALSE
           <bool-list> ::= <bool-expr> | <bool-list> <bool-expr>
           <bool-expr> ::= <name> | <bool> | <predicate> |
                           ( <bool-monadic-op> | <bool-expr> ) |
                           ( <bool-list-op> <bool-list> )
// Descriptions are comments that are carried along with the constructs
         <string-list> ::= <string> | <string-list> <string>
         <description> ::= ( description <string-list> )
// When we need to break up a string across lines, we use concat to
// put it back together (just like descriptions)
              <concat> ::= ( concat <string-list> )
// Unions are unnamed collections of one or more symbols
// (with matching types)
        <union-symbol> ::= <atom> | <group-name>
          <union-list> ::= <union-symbol>                |
                           <union-list> <union-symbol>   |
                           ( union <union-list> )        |
                           <union-list> ( union <union-list> )
               <union> ::= ( union <union-list> ) | <union-symbol>
// Groups are named and typed unions (all symbols must have one type)
      <group-part-list> ::= <union> | <description> <union> |
                            <union> <description>
          <group-name> ::= <name>
               <group> ::= ( group <group-name> <type>
                             <group-part-list> )
// Credentials
           <cred-part> ::= <description> | <assertion>
      <cred-part-list> ::= <cred-part> | <cred-part-list> <cred-part>
           <cred-name> ::= <name>
          <credential> ::= ( credential <cred-name>
                             <cred-part-list> )
// Dispositions
      <agent-directives> ::= [Some set of terminals of type
                             agent-directive_t]
    <agent-directive-list> ::= <agent-directives> |
                               <agent-directive-list> <agent-directives>
      <agent-directive> ::= ( agent-directive <agent-directive-list> )
// preliminary list of severity codes; more TBD
         <log-severity> ::= [Some set of terminals of type severity_t]
        <log-directive> ::= ( log-directive <log-severity> <string> ) |
                            ( log-directive <log-severity> )
// preliminary list of disposition codes; more TBD
     <disposition-code> ::= [Some set of terminals of type code_t]
            <disp-code> ::= ( code <disposition-code> )
            <disp-part> ::= <description> | <disp-code>|
                            <log-directive> | <agent-directive>
       <disp-part-list> ::= <disp-part> | <disp-part-list> <disp-part>
     <disposition-name> ::= <name>
          <disposition> ::= ( disposition <disposition-name>
                              <disp-part-list> )
// Conditions
   <condition-part-list> ::= <description> <assertion> |
                             <assertion> <description> |
                             <assertion>
       <condition-name> ::= <name>
            <condition> ::= ( condition <condition-name>
                              <condition-part-list> )
// Outcomes are bindings of conditions to dispositions used in rules
       <outcome-default> ::= ( default <disposition-name> )
                <guard> ::= if | ifnot
        <outcome-clause> ::= ( <guard> <condition-name>
                               <disposition-name> )
          <outcome-list> ::= <outcome-default> |
                             <outcome-clause> <outcome-list>
             <immediate> ::= ( immediate <outcome-list> )
                 <final> ::= ( final <outcome-list> )
         <outcome-types> ::= <immediate> | <final>|
                             <immediate> <final> |
```

TABLE C-continued

```
                              <final> <immediate>
             <outcome> ::= ( outcome <outcome-types> )
// Rules
             <protocol> ::= ( protocol <union> ) |
                            ( protocol <meta-value> )
               <action> ::= ( action <union> ) |
                            ( action <meta-value> )
            <initiator> ::= ( initiator <cred-name> ) |
                            ( initiator <meta-value> )
               <target> ::= ( target <cred-name> ) |
                            ( target <meta-value> )
                <agent> ::= ( agent <cred-name> )
            <rule-name> ::= <name>
            <rule-list> ::= <rule-name> | <rule-list> <rule-name>
         <prerequisite> ::= ( prerequisite <rule-list> )
          <rank-above> ::= ( rank-above <rule-name> )
            <rule-part> ::= <description> | <protocol> | <action> |
                            <initiator> | <target> | <outcome> |
                            <prerequisite> | <rank-above> | <agent>
       <rule-part-list> ::= <rule-part> | <rule-part-list> <rule-part>
                 <rule> ::= ( rule <rule-name>
                              <rule-part-list> )
// Policy is the top-level construct of the policy
// specification section
          <policy-part> ::= <description> | <group> | <credential> |
                            <condition> | <disposition> | <rule>
     <policy-part-list> ::= <policy-part> |
                            <policy-part-list> <policy-part>
          <policy-name> ::= <name>
     <language-version> ::= <version-string>
               <policy> ::= ( policy <policy-name> <language-version>
                              <policy-part-list> )
//
// Productions for the annotation section
//
       <assertion-type> ::= <meta-value> | single-value | multi-value
              <weight> ::= ( weight <symbol> <assertion-type> )
      <weight-penalty> ::= ( weight-penalty <integer> )
      <rank-cred-part> ::= <weight> | <weight-penalty>
 <rank-cred-part-list> ::= <rank-cred-part> |
                            <rank-cred-part-list> <rank-cred-part>
    <ranked-credential> ::= ( ranked-credential <cred-name>
                              <rank-cred-part-list>
// Annotation is the top-level construct of the annotation section
  <annotation-part-list> ::= <ranked-credential> |
                             <annotation-part-list> <ranked-credential>
           <annotation> ::= ( annotation <policy-name>
                              <language-version>
                              <annotation-part-list> )
```

In the preferred embodiment the policy specification language 108 is typed. The policy compiler 101 performs the necessary type checking of all S-expressions found in a policy specification 107. Typing aids in catching and diagnosing both common and subtle user errors. A preferred embodiment of the type information is described herein below in Table D.

TABLE D

Types

The subtables in this section describe, in a pseudo-formal manner, the type information in the language that is enforced by the parser. The types used should be self-evident.
First some notation used throughout the tables:
( list-of type ) - ( foo ( list-of T ) ) → ( foo A B C ) where A, B, and C are of the type T; the list must have at least one element.
( multi-of type ) - ( foo ( multi-of T ) ) → ( foo ( union A B C ) )
where A, B, and C are of the type T or → ( foo ABC ) where ABC is the name of a group of type T.
( mix-of type1 type2 type3 ) - ( foo ( mix-of R S T ) ) → ( foo A B C D ) where A, B, C, and D are randomly of types R, S, and T.
match - a type that is required to be the same as all other TABLE D-continued Types occurrences of match in the expression -
( foo match match ) requires that the two arguments of foo be of the same type (e.g., int_t, string_t).

The following table lists the typed attributes used in conditions and credentials.

| Attribute Name | Applicable Protocols | Argument Types | Result Type |
| --- | --- | --- | --- |
| agent-attribute | all-protocols | — | (multi-of agent_attr_t) |
| auth-status | SSL | — | auth_status_t |
| cert-status | SSL | — | cert_status_t |
| der-cert | SSL | — | octet_string_t |
| encipher-keysize | SSL | — | int_t |
| http-cookie | HTTP | string_t | (multi-of string_t) |
| http-password | HTTP | — | string_t |
| http-req-hdr | HTTP | string_t | string_t |
| http-resp-hdr | HTTP | string_t | string_t |
| http-set-cookie | HTTP | string_t | (multi-of string_t) |
| http-status-code | HTTP | — | int_t |
| http-username | HTTP | — | string_t |
| icmp-gateway-address | ICMP | — | ip_addr_t |
| icmp-nested-address | ICMP | — | ip_addr_t |
| icmp-nested-port | ICMP | — | int_t |
| initiator-access-rate | all-protocols | — | int_t |
| initiator-auth-keysize | SSL | — | int_t |
| initiator-violation-rate | all-protocols | — | int_t |
| ip-address | IP UDP TCP ICMP | — | ip_addr_t |
| ip-port | IP UDP TCP ICMP | — | int_t |
| ke-keysize | SSL | — | int_t |
| mac-address | IP UDP TCP ICMP | — | mac_addr_t |
| protocol-version | all-protocols | — | version_t |
| ssl-ciphersuite | SSL | — | ciphersuite_t |
| target-access-rate | all-protocols | — | int_t |
| target-auth-keysize | SSL | — | int_t |
| target-violation-rate | all-protocols | — | int_t |
| url | HTTP | — | string_t |
| x509-cert-path | SSL | — | cert_path_t |
| x509-issuer | SSL | — | string_t |
| x509-subject | SSL | — | string_t |

The table below lists all the operations in the language that return a dynamic result. For each operation it shows both argument and result types

| Operation | Result Type | Argument Types |
| --- | --- | --- |
| absent | bool_t | string_t |
| and | bool_t | (list-of bool_t) |
| default | disposition_t | disposition_t |
| eq | bool_t | match match |
| has | bool_t | cert_path_t cred_t |
| hash | base64_t | hash_alg_t octet_string_t |
| ge[1] | bool_t | match match |
| gt[1] | bool_t | match match |
| if | disposition_t | condition_t disposition_t |
| ifnot | disposition_t | condition_t disposition_t |
| ip-mask | bool_t | ip_addr_t ip_mask_t |

[1]Operator only supports types int_t and version_t as arguments.

| ip-range | bool_t | ip_addr_t ip_addr_t ip_addr_t |

-continued

| Operation | Result Type | Argument Types |
|---|---|---|
| le[1] | bool_t | match match |
| lt[1] | bool_t | match match |
| member | bool_t | match (multi-of match) |
| not | bool_t | bool_t |
| or | bool_t | ( list-of bool_t ) |
| prefix | bool_t | string_t string_t |
| present | bool_t | string_t |
| range[1] | bool_t | match match match |
| root | bool_t | cert_path_t cred_t |
| substring | bool_t | string_t string_t |
| version | version_t | string_t |

The table below is pushing the concept of □type□ far beyond its normal meaning since, in it, we often use type merely to convey positional information. It shows the type of every object in the language and the types of their arguments.

| Object Name | Object Type | □Argument□ Types |
|---|---|---|
| action | act_t | ( multi-of action_t ) |
| agent | agt_t | credential_t |
| agent-directive | agtdir_t | ( multi-of agent_directive_t ) |
| assertion | assert_t | bool_t |
| code | code_def_t | code_t |
| condition | cond_t | condition_t ( mix-of desc_t bool_t ) |
| credential | cred_t | credential_t ( mix-of assert_t desc_t prot_t ) |
| description | desc_t | ( list-of string_t ) |
| disposition | disp_t | disposition_t ( mix-of desc_t code_def_t log_t agtdir_t ) |
| final | dispo_t | (list-of guard_t) |
| group | group_t | match type_t ( multi-of match ) |
| immediate | dispo_t | (list-of guard_t) |
| initiator | init_t | credential_t |
| log-directive | log_t | severity_t string_t |
| outcome | out_t | ( list-of dispo_t ) |
| policy | policy_def_t | policy_t string_t ( mix-of desc_t group_t cred_t cond_t disp_t rule_t def_t ) |
| prerequisite | pre_t | ( list-of rule_t ) |
| protocol | prot_t | ( multi-of protocol_t ) |
| rank-above | rank_t | rule_t |
| rule | rule_def_t | rule_t ( mix-of desc_t agt_t prot_t act_t init_t targ_t out_t pre_t rank_t ) |
| target | targ_t | credential_t |
| union | ( multi-of match ) | ( list-of match ) |

It is noted that the list of credential and condition attributes included in Table D is by no means complete. In other embodiments, the set of attributes is expanded or reduced to reflect the set of protocols supported by the Policy Monitoring System.

It is noted that although the remainder of this disclosure describes the specification language 108 by means of examples, and that for improved readability, said examples use the advanced rather than the canonical representation of S-expressions, this is not meant to further limit the invention.

In the preferred embodiment of the invention, the language 108 allows for comments to be embedded in S-expressions. A comment is allowed anywhere whitespace is valid. A comment begins with "//" and continues to the end-of-line. In compilation, comments are ignored because they serve merely as an aid to the human user.

In the preferred embodiment of the invention, the language 108 allows for external files to be included using the #include syntax of C. Included files are supported to enhance modularity and reusability of policy language segments.

In the preferred embodiment of the invention, the language, 108 allows for macros to be defined using the #define syntax of C. Macros are supported to enhance readability. By convention, macros start with, an uppercase letter but need not be fully capitalized.

The language 108 comprises the following first-class objects:

Condition
Credential
Disposition
Group
Policy
Rule

In the preferred embodiment first-class objects have names. Names are normally used to refer to an object from another object. By convention, names of built-in objects start with a lowercase letter and use hyphens (-) to separate words. Names of user-defined objects start with an uppercase letter and use intercaps or underscores (_) to separate words, but do not use hyphens. Names of data types start with a lowercase letter and end with an underscore followed by a lowercase 't' (_t).

In the preferred embodiment a named object must be defined before its name can be used. The scope of a name is that of the entire policy specification as defined by the policy object.

In the preferred embodiment first-class objects may optionally include a description field. The description provides human readable text associated with the object. Unlike comments, description fields are preserved by the policy parser. When using the advanced representation, description strings may be split across several lines, using the C rules of string concatenation. That is, following the description token are one or more character strings, each enclosed in a set of double quotes.

Policy

In the preferred embodiment a policy is the top-most object defined by the specification language 108 and includes all other first-class objects. A policy manager may load several policies into its internal database. However, at any one point in time, only one active policy is in effect. That is the policy known to the Policy Engine 101. Following is an example of a policy object.

```
( policy Sample_Policy_1   "1.0"    // policy <name> <version>
    ( description "This is a policy specification description"
        "that is continued on a second line" )
    . . .
)
```

In the preferred embodiment a policy object has two mandatory parameters: name, which is used to reference the policy, and version number, which defines the version of the policy specification language 108. A policy's version number is used to check for compatibility between a policy specification and a policy compiler.

Groups and Unions

In the preferred embodiment groups are named collections of a given type. The union object creates the collection from a set of items. The group object gives the union a name and a type. Following is an example expressing a collection of colors:

```
( group SomeColors color_t       // group <name> <type>
    ( description "Some colors I like" )
    ( union RED GREEN YELLOW )
)
```

In the example, the object identifies RED, GREEN and YELLOW as items, i.e. symbols, of type color_t (a fictitious data type) collected in a set named SomeColors. By convention, symbols defined in unions are fully capitalized.

In the preferred embodiment once a symbol is identified as being of a certain type, it is transparently added to an unnamed set of items of that type. It may then be reused in other unions, groups or wherever an individual item of that type is valid. For example, a valid way to define another group is as follows:

```
( group RedByAnyOtherName color_t
    ( description "Red in different languages" )
    ( union RED ROSSO ROUGE VERMELHO )
)
```

However in the preferred embodiment the following group would not be allowed since RED would already have been tagged as being of type color_t.

```
( group AfewOfMyFavoriteThings thing_t
    ( union RED PASTA WINE )   // ERROR! RED previously defined as
)                               // having type color_t
```

In the preferred embodiment sets can be combined with other predefined sets. For example,

```
( group MoreColors color_t
    ( union
        SomeColors
        RedByAnyOtherName      // overlapping ok
        PURPLE BEIGE BURGUNDY
    )
)
```

It is noted that RED overlaps both SomeColors and RedByAnyOtherName, which according to the invention is perfectly acceptable. The resulting set will include only one instance of the set item RED.

In the preferred embodiment unions are similar to the C enum type, with the added benefit that unions can be combined and extended without concern for conflicting item values.

In a preferred embodiment unions are used, but are not limited to, to define collections of items, such as, for example, IP addresses, MAC addresses, integers, version numbers and hash values. That is, unions can define any data item that has a primitive data type in the language. An example of a group of IP addresses is defined as:

```
( group MyComputers ip_addr_t
    ( union
        207.5.63.23         // desktop at work
        207.5.63.42         // laptop
        128.7.16.64         // home computer
    )
)
```

In the preferred embodiment the type of the items in the union must agree with the type specified in the group.

In a preferred embodiment, groups are referenced from other first-class objects. For example, groups are typically used to define collections of protocol actions, SSL ciphersuites, and IP addresses. Note that wherever a group is allowed, the following are also valid:

A union object (essentially, an unnamed group) provided that any symbols used as elements in the union have already been given a type via a group definition.

A single collection item. This is equivalent to a union object with a single element. If the item is a symbol, its type must have been previously defined in a group.

A list of built-in groups is given in section Table A.

Credentials

In the preferred embodiment a credential is a statement about a principal in a protocol event. It consists of a logical expression containing one or more assertions about the attributes that make up a principal's credentials. When a policy rule is evaluated against a protocol event, the credentials presented in the protocol event are compared to the credentials specified in a purported credential object. If the logical expression defined in the credential object is satisfied, the principal's presented credentials are said to satisfy the purported credentials. As an example, the following purported credentials are satisfied if the principal's IP address is 207.5.63.8 and its IP port number is either 80 or greater than 443.

```
( credential Credentials_Example_1     // credential <name>
    ( assertion
        ( and
            ( eq ip-address 207.5.63.8 )
            ( or
                ( eq ip-part 80 )
                ( gt ip-port 443 )
            )
        )
    )
)
```

In the preferred embodiment each protocol has a set of attributes that may be used to build purported credentials. Table E herein below lists all the attributes currently defined and, for each attribute, it shows, the protocols where the attribute might be included in the presented credentials, as well as the operations where the attribute may be used as an operand.

TABLE E

| Attribute Name | Applicable Protocols | Description | Compare Operations |
|---|---|---|---|
| agent-attribute | all-protocols[2] | The attributes of the reporting Agent, as a union of symbolic names | member |
| cert-status | SSL | The validity status of a certificate | eq, member |
| der-cert | SSL | A DER encoded certificate | hash |
| http-password | HTTP | The password used in basic authentication | eq, member, substring, prefix |
| http-username | HTTP | The user name used in basic authentication | eq, member, substring, prefix |
| ip-address | IP UDP TCP ICMP | An IP address | eq, member, ip-mask, ip-range |
| ip-port | IP UDP TCP ICMP | An IP port | eq, member, gt, ge, lt, le, range |
| mac-address | IP UDP TCP ICMP | A MAC address | eq, member |
| url | HTTP | A URL | eq, member, substring, prefix |
| x509-cert-path | SSL | An X.509 certificate chain | root, has |
| x509-issuer | SSL | An X.509 certificate issuer | eq, member, substring, prefix |
| x509-subject | SSL | An X.509 certificate subject | eq, member, substring, prefix |

[2]Can be used to identify the reporting Agent in any policy rule must but must not be mixed with other credential attributes.

It is noted that the list of credential attributes included in Table E is by no means complete. In other embodiments, the set of attributes is expanded or reduced to reflect the set of protocols supported by the Policy Monitoring System.

In the preferred embodiment each attribute can be thought of as having an implied getter function that returns its value. Most attribute getters take no arguments and return a single value. In the preferred embodiment, however, some attribute getters (e.g. http-req-hdr and http-cookie) are functions that take one or more arguments and may return complex results. For example, http-cookie takes as an argument the name of a cookie in an HTTP request header and returns its value or values as a union of strings.

In the preferred embodiment it is important not to mix credential attributes from different protocol sets in a credential specification. For example, combining ip-address and der-cert in the same credential object would be an error and flagged by the policy compiler. As another example, using a credential in a policy rule for a protocol action that is incompatible with the credential attributes in the credential object is considered an error, flagged by the policy compiler. However, it is possible to use those attributes in two separate credential objects and establish relationships between them within policy rules (e.g. access to resource X is restricted to principals previously authenticated with credentials Y). See example Check_Access_Denial herein below for an example of establishing this type of relationships in policy rules.

In the preferred embodiment the credential attribute agent-attribute is used to define the credentials of the Agent 102 reporting the protocol event 103. Agents are individually configured with a set of attributes, which are used to identify them to a policy manager. In another embodiment, some agent attributes might uniquely identify a specific Agent (e.g. MONITOR_NEXT_TO_ROUTER$_x$) while others might identify a group of Agents (e.g. ALL_MONITORS_IN_SUBNET$_y$). The agent-attributes attribute returns a union of identification attributes for the reporting Agent 102. In the preferred embodiment within a credential specification, assertions about agent attributes may not be mixed with assertions about any other credential attributes.

Table F herein below lists all the operations used in a preferred embodiment to make assertions about attributes.

TABLE F

| Operation | Description |
|---|---|
| absent | Whether (true) the attribute denoted by the operand does not have a value in the protocol event |
| and | Logical AND of a list of boolean expressions, its operands |
| eq | Whether(true) two operands have the same value |
| ge | Whether (true) the first operand's value is greater than, or equal to, the second's |
| gt | Whether (true) the first operand's value is greater than the second's |
| has | Whether (true) the certificate chain defined by the first operand's value contains a certificate that satisfies the second operand (a credential name) |
| hash | Computes a digest of the second operand's value using the hashing function defined by the first operand; returns the hash as a hexadecimal string |
| ip-mask | Whether (true) the first operand's value is included in the set of IP addresses defined by the second operand, an IP address prefix [RFC2280]; an address prefix is represented as an IPv4 address (dotted-decimal format with four integers) followed by the character slash □/□ followed by an integer in the range from 0 to 32. The latter denotes the number of high-order bits from the preceding address that constitute a subnetwork address. If the subnetwork address bits match exactly the corresponding bits in the first operand's value, the operation returns true. The following are valid address prefixes: 128.9.128.5132, 128.9.0.0116, 0.0.0.0/0; the following address prefixes are invalid: 0/0, 128.9/16 since 0 or 128.9 are not dotted-decimal strings containing four integers. |
| ip-range | Whether (true) the first operand's value is included in the set of IPv4 addresses defined by an IP address range whose lower bound is the operand with the lower value and whose upper bound is the operand with the higher value; the three operand values are taken as 32-bit unsigned integers and, if the first operand value falls within the inclusive numerical range defined by the two other operand values, the operation returns true |
| le | Whether (true) the first operand's value is less than, or equal to, the second's |
| lt | Whether (true) the first operand's value is less than the second's |
| member | Whether (true) the first operand's value is a member of the set defined by the second operand (a union) |
| not | Logical negation of its operand's value |
| or | Logical OR of a list of boolean expressions, its operands |
| prefix | Whether (true) the string that constitutes the first operand's value includes, starting at the first character, the string defined by the second operand |
| present | Whether (true) the attribute denoted by the operand has a value in the protocol event |
| range | Whether (true) the first operand's value is within the inclusive numerical range defined by the values of the second a third operands; the range comprises the set of values between the lower operand value and the higher |
| root | Whether (true) the certificate chain defined by the first operand's value has, as its root, a certificate that satisfies the second operand (a credential name) |
| substring | Whether (true) the string that constitutes the first operand's value includes the string defined by the second operand |

It is noted that the list of operations included in Table F is by no means complete. In other embodiments, the set of operations is expanded or reduced to reflect the set of protocols and features supported by the Policy Monitoring System.

In the preferred embodiment credentials may be combined with other credentials or with additional assertions. Consider the following example:

```
( credential Credentials_Example_2
    ( assertion
        ( or
            Credentials_Example_1
            and
                ( ip-mask ip-address 207.5.0.0/16 )
                ( range ip-port 25 443 )
            )
        )
    )
)
```

The example herein above defines purported credentials that will be satisfied if either Credentials_Example_1 is satisfied or if the presented credentials' IP address falls within the subnetwork defined by the address prefix 207.5.00/16 and if the IP port is between 25 and 443, inclusive.

In the preferred embodiment the absence of an assertion about a specific attribute in a credential specification indicates that its value is to be ignored in considering the presented credentials. In the preferred embodiment, it is often useful to indicate that a particular attribute must or must not be specified in the presented credentials, irrespective of the attribute's value, if any. The operations absent and present accomplish this, as illustrated by the following examples:

```
( credential Credentials_Example_3
    ( assertion
        ( and
            // http-username must exist, but don't care about its value
            ( present http-username )
            // the absence of an assertion about http-password indicates
            // that its presence or absence is irrelevant
        )
    )
)
( credential Credentials_Example_4
    ( assertion
        ( and
            // an X.509 certificate must not have been presented
            ( absent der-cert )
        )
    )
)
```

Conditions

In the preferred embodiment a condition defines a constraint upon a protocol event 103. Said condition comprises a logical expression containing one or more assertions about attributes of the protocol event. Policy rules use conditions to specify particular constraints that must or must not be satisfied by the protocol event 103.

Table G lists attributes of a protocol event 103 that may be used when formulating conditions. For each attribute the table shows protocols for which the attribute is defined, as well as the operations which can take the attribute as an operand.

TABLE G

| Attribute Name | Applicable Protocols | Description | Compare Operations |
|---|---|---|---|
| auth-status | SSL | The status of an authenticated session at the end of the authentication handshake | eq, member |
| encipher-keysize | SSL | The size of the key used for data encipherment (e.g., size of an IDEA key) | eq, member, gt, ge, lt, le, range |
| http-cookie | HTTP | Takes as an argument the name of a cookie in the request header and returns its value(s) as a union of strings | member |
| http-req-hdr | HTTP | Takes as an argument the name of a client request header and returns its value | eq, member, substring, prefix |
| http-resp-hdr | HTTP | Takes as an argument the name of a server response header and returns its value | eq, member, substring, prefix |
| http-set-cookie | HTTP | Takes as an argument the name of a cookie in the response header and returns its value(s) as a union of strings | member |
| http-status-code | HTTP | The status code returned on HTTP responses (aka response code) | eq, member, gt, ge, lt, le, range |
| icmp-gateway-address | ICMP | The IP address of the gateway host on a redirect message | eq, member, ip-mask, ip-range |
| icmp-nested-address | ICMP | The IP address carried in a □destination unreachable□ message | eq, member, ip-mask, ip-range |
| icmp-nested-port | ICMP | The port number carried in a □destination unreachable□ message | eq, member, gt, ge, lt, le, range |
| initiator-access-rate | all-protocols | The rate at which the current active principal has been the initiator of communications, over a predefined (configurable) period of time | eq, member, gt, ge, lt, le, range |
| initiator-auth-keysize | SSL | The size of the key used for initiator authentication and/or digital signatures (e.g., size of public key modulus) | eq, member, gt, ge, lt, le, range |
| initiator-violation-rate | all-protocols | The rate at which the current active principal has been the initiator of security policy violations, over a predefined (configurable) period of time | eq, member, gt, ge, lt, le, range |
| ke-keysize | SSL | The size of the key-encipherment key (e.g., size of public key modulus) | eq, member, gt, ge, lt, le, range |
| protocol-version | all-protocols | The version of the protocol | eq, member, gt, ge, lt, le, range |
| ssl-ciphersuite | SSL | The negotiated ciphersuite | eq, member |
| target-access-rate | all-protocols | The rate at which the current passive principal has been the target of communications, over a predefined (configurable) period of time | eq, member, gt, ge, lt, le, range |
| target-auth-keysize | SSL | The size of the key used for target authentication and/or digital signatures (e.g., size of public key modulus) | eq, member, gt, ge, lt, le, range |

TABLE G-continued

| Attribute Name | Applicable Protocols | Description | Compare Operations |
|---|---|---|---|
| target-violation-rate | all-protocols | The rate at which the current passive principal has been the target of security policy violations, over a predefined (configurable) period of time | eq, member, gt, ge, lt, le, range |

It is noted that the list of condition attributes included in Table G is by no means complete. In other embodiments, the set of attributes is expanded or reduced to reflect the set of protocols and features supported by the Policy Monitoring System.

In the preferred embodiment operations listed in Table G may be used to build assertions about condition attributes.

In the preferred embodiment condition attributes cannot mix with those from different protocol sets in a condition specification. A condition used in a policy rule for a protocol that is incompatible with the condition attributes in the condition object is considered an error and is flagged by the policy compiler. For example, it is illegal to use ssl-ciphersuite in a condition referenced by a policy rule for HTTP.

Following are some examples:

```
( group Strong_RSA_Ciphersuites   ciphersuite_t
    ( description "Strong ciphers with RSA key exchange" )
    ( union   SSL_RSA_WITH_RC4_128_MD5
              SSL_RSA_WITH_RC4_128_SHA
              SSL_RSA_WITH_IDEA_CBC_SHA
              SSL_RSA_WITH_3DES_EDE_CBC_SHA
              SSL_DH_RSA_WITH_3DES_EDE_CBC_SHA
              SSL_DHE_RSA_WITH_3DES_EDE_CBC_SHA
    (
(
( condition SslV3StrongCiphers        // condition <name>
    ( assertion
        ( and
            ( ge protocol-version ( version "3.0" ) )
            ( member ssl-ciphersuite Strong_RSA_Ciphersuites )
            ( ge ke-keysize 768 )
            ( ge target-auth-keysize 1024 )
        )
    )
)
( condition HackerTripwire
    ( assertion
        ( ge initiator-violation-rate 10
    )
)
( condition ProtectSSL
    ( assertion
        ( and SslV3StrongCiphers HackerTripwire )
    )
```

Herein above, the condition SslV3StrongCiphers can be used with an SSL protocol event to ensure that SSL 3.0 or higher is used, that the negotiated ciphersuite is one of the strong RSA-based ciphersuites, that the RSA key-encipherment key has a modulus of no less than 768 bits, and that the RSA authentication key has a modulus of no less than 1024 bits.

Herein above, the condition HackerTripwire can be used with any protocol event 103 to ensure that the active principal 141 is not a potential attacker. The third condition, ProtectSSL, simply combines the first two.

Dispositions

In the preferred embodiment a disposition defines an outcome of a policy rule. Each policy rule may have many possible outcomes depending on, for example, constraints imposed on the protocol event.

See Table H herein for a list of disposition codes and an explanation of their meanings in the preferred embodiment.

TABLE H

| Disposition Code | Description |
|---|---|
| OK | The network event conforms to the security policy |
| CONTINUE | Additional information is needed before determining whether or not the network event conforms to the security policy |
| ACCESS_DENIED | Access to the target resource is denied by the security policy |
| AUTHEN-TICATION_VIOLATION | Authentication between the communication parties does not conform to the requirements set out by the security policy |
| SECURITY_ATTACK | A security attack has been detected |
| SECURITY_QOS | The security quality of service parameters associated with a protocol event do not meet the requirements set out by the security policy |
| POLICY_ERROR | An error has been detected in the security policy specification |

It is noted that the list of disposition codes included in Table H is by no means complete. In other embodiments, the set of disposition codes is expanded, or reduced to reflect the set of features supported by the Policy Monitoring System.

Table I herein below lists possible severity codes in the preferred embodiment.

TABLE I

| Severity Code | Description |
|---|---|
| CRITICAL | Critical security violation, e.g., the network is undergoing an active security attack |
| HIGH | High-severity security violation, e.g., attempt to access sensitive data |
| MEDIUM | Medium-severity security violation, e.g., attempt to access a protected (but not highly sensitive) resource |
| WARNING | Low-severity security violation, e.g., an incorrect password was entered |
| MONITOR | A security violation was not detected but an unusual or potentially suspect network event has occurred, e.g., TELNET access to a public web server |
| INFORMATION | A perfectly valid network event is being reported for informational purposes only |

It is noted that the list of severity codes included in Table I is by no means complete. In other embodiments, the set of severity codes is expanded or reduced to reflect the set of features supported by the Policy Monitoring System.

Table J herein below lists possible agent directives in the preferred embodiment.

TABLE J

| Agent Directive | Description |
|---|---|
| DECRYPT | The Agent is instructed to decrypt all traffic at the current protocol layer |
| DISRUPT | The Agent is instructed to terminate and/or disrupt all subsequent traffic associated with this network event |
| LOG_TRAFFIC | The Agent is instructed to log all traffic at the current protocol layer |

It is noted that the list of agent directives included in Table J is by no means complete. In other embodiments, the set of agent directives is expanded or reduced to reflect the set of features supported by the Policy Monitoring System.

Following are examples of preferred embodiments of dispositions:

```
// Network event ok but should be logged
disposition Ok_Monitor          // disposition <name>
    ( code OK )                 // disposition code
    ( log-directive             // logging directive
      MONITOR                   // severity code
      "Monitored activity" )    // logging string
)
```

The Ok_Monitor disposition is used to dispose of a valid network event 103 while flagging a logging subsystem that this event should be logged at a low severity level (MONITOR).

```
// Decrypt SSL session data and continue processing network event
( disposition Continue_Decrypt
    ( code CONTINUE )
    ( agent-directive DECRYPT )
)
```

The Continue_Decrypt disposition is used to inform the Policy Engine 101 that additional information is needed from the Agent 102 before determining a final disposition 105 for the network event 103 while, at the same time, instructing an appropriate Agent to decrypt all traffic at a current protocol layer.

```
// access to target resource is denied
( disposition Access_Denied
    ( code ACCESS_DENIED
    ( log-directive
      HIGH
      "Access denied" )
)
```

The Access_Denied disposition is used as a final disposition 105 for a network event 103. It denotes a policy violation.

A list of built-in dispositions of the preferred embodiment is provided herein above in Table A.

Rules

In the preferred embodiment a rule object defines a policy rule. A policy rule governs a specific interaction, or set of interactions, between two communicating entities. The Policy Engine 101 evaluates policy rules against protocol events to determine if the latter conform to the active security policy.

Following is an example of a policy rule according to a preferred embodiment of the invention:

```
( rule Tcp_Ext2Int                          // rule <name>
    ( description "Communications from external hosts" )
    ( agent Foo_Subnet_Monitor )            // the reporting agent
    ( protocol TCP )                        // the protocol
    ( action CONNECT )                      // the protocol action
    ( initiator External_Hosts )            // the active principal
    ( target Internal_Hosts )               // the passive principal
    ( outcome
```

-continued

```
        ( immediate                         // the immediate outcome
        // if/if not <condition> <disposition>
          ( if Catch_Suspect Security_Attack_Possible )
          ( if Catch_Attacker Security_Attack_Progress
          ( default continue )              // using built-in disposition
        )
        ( final                             // the final outcome
          ( default Ok_Monitor )
        )
    )
)
```

In the preferred embodiment a policy rule comprises:

Agent—represents Agent 102 that reported the protocol event 103. The Agent 102 is denoted by a credential name. The policy rule is only considered if this credential is satisfied by the credentials presented by the reporting Agent 102. In the example above, Foo_Subnet_Monitor is the name of a credential object identifying one or more Agents. This field is optional. If omitted, the rule applies to all Agents.

Protocol—a protocol to which the rule is applicable. A protocol event 103 addresses one and only one protocol. This field is mandatory. Note that the special token ignore is used to denote a rule that applies to all protocols.

Action—a protocol action to which this rule is applicable. Each protocol comprises one or more several distinct actions (e.g. connect, transfer-data, release), some of which might be of interest to the security policy. A protocol event denotes one and only one protocol action. This field is mandatory. Note that the special token ignore is used to denote a rule that applies to all actions within the specified protocol.

Initiator—represents the active principal 141 in the protocol event 103. The initiator 141 is denoted by a credential name or by the special tokens absent (credentials must not be presented in the protocol event), present (credentials must be presented but their actual value is unimportant) and ignore (credentials may or may not be presented). In the example herein above, External_Hosts is the name of a credential object identifying one or more TCP/IP hosts. This field is mandatory.

Target—represents the passive principal 142 in the protocol event 103. The target 142 is denoted by a credential name or by the special tokens absent, present and ignore. In the example above, Internal_Hosts is the name of a credential object identifying one or more TCP/IP hosts. This field is mandatory.

Prerequisite—(not shown in the example above) one or more rules that must be satisfied by a previous protocol event. Prerequisite rules are identified by names. Prerequisites are used to place additional constraints on an entire network event 103. See an example herein that illustrates the use of prerequisites in rules. It should be noted that if two or more rules are listed as prerequisites, the prerequisite is satisfied if any of the listed rules taken in the order in which they are listed satisfies a previous protocol event. This field is optional.

Outcome—the outcome section defines what to do with the protocol (or network) 103 event if the current policy rule is applied to the protocol event. That is, if the rule is selected by the Policy Engine 101 as the most suitable for the protocol (or network) event. Every policy rule must have a disposition that applies to the protocol event and another disposition that applies to the entire network event. In some cases these are one and the same. The Policy Engine 101 evaluates the outcome and produces a disposition for either the protocol or the network event. There are two outcomes defined:

Immediate—an immediate outcome applies to the protocol event immediately. A policy rule may or may not include an immediate outcome. If it does, the outcome is evaluated as soon as the rule is selected for the protocol event. If it does not, there is an implied disposition for the protocol event, a built-in disposition continue (see Table A for the definition) which instructs the Policy Engine 101 to continue processing the network event. If the immediate outcome generates a disposition with a disposition code other than CONTINUE, this disposition becomes the disposition for the entire network event. In this instance, the final outcome, defined herein below, will not be evaluated.

Final—an outcome that applies to the entire network event if this rule becomes a final rule evaluated for that event. The final outcome must be specified if the immediate outcome does not generate a final disposition for the network event. If it is not, an implied disposition for the network event, the built-in disposition policy-error, see Table A for the definition, denotes a policy specification error. The final outcome is evaluated when the Policy Engine determines that no additional protocol events are to be considered for the current network event. The final outcome must always generate a final disposition, i.e. a disposition with a disposition code of CONTINUE is not allowed in a final outcome.

In the preferred embodiment each outcome section comprises one or more conditional statements, each followed by a disposition. The purpose of conditional statements is to specify constraints upon a protocol event, or special conditions that, if satisfied, cause the generation of an alternate disposition for the protocol (or network) event. Conditional statements are evaluated in the order in which they are specified within the outcome section.

In the preferred embodiment a conditional statement starts with one of the following keywords:

if—takes as arguments a condition and a disposition, each referenced by name. If the condition evaluates to TRUE, the disposition becomes the disposition for the protocol event.

if not—takes as arguments a condition and a disposition, each referenced by name. If the condition evaluates to FALSE, the disposition becomes the disposition for the protocol event.

default—takes a single argument, a disposition referenced by name. It is equivalent to a condition that is always satisfied, thereby triggering the disposition that is its argument. This conditional statement is mandatory and must be the last conditional statement in an outcome.

The following examples illustrate the use of prerequisites in rules in a preferred embodiment. The first rule is the prerequisite.

```
( credential Host_A
    ( assertion
        ( and
            ( eq ip-address 207.5.63.8 )
            ( eq ip-port 80 )
        )
    )
)
( rule Access_Host_A
    ( protocol TCP )
    ( action CONNECT )
    ( initiator ignore )
    ( target Host_A )
    ( outcome
        ( final
            ( default Access_Denied )   // Access_Denied defined above
        )
    )
)
```

Herein above, the rule Access_Host_A states that access to host_A on port 80 by any host is denied, unless explicitly allowed by a rule at a higher protocol layer. Note the use of a final outcome, which is only evaluated if Access_Host_A becomes the applicable rule for the entire network event. The implied disposition for the protocol event is CONTINUE.

This rule can be overridden by another rule at the HTTP layer stating that access is allowed to host A on port 80, as shown below:

```
( rule Http_To_Host_A
    ( protocol HTTP )
    ( action ignore )
    ( initiator ignore )
    ( target ignore )
    ( prerequisite Access_Host_A )   // reference to rule above
    ( outcome
        (immediate
            ( default ok )            // using built-in disposition
        )
    )
)
```

The end result of the two policy rules herein above is to prevent all access to host A on port 80 unless that access is using HTTP over TCP/IP.

In the preferred embodiment a prerequisite rule is any rule that is selected for a previous protocol event. This includes rules in the same protocol layer. As an example, to ensure that a web server requires HTTP authentication before allowing access to a specific web page, use the following rules:

```
( credential Some_Url
    ( assertion
        ( prefix url "//myserver.com/Documents" )
    )
)
( rule Host_A_Anon_Access
    ( protocol HTTP )
    ( action ( union GET POST ) )
    ( initiator absent )
    ( target Some_Url )
    ( prerequisite Access_Host_A )   // from example above
    ( outcome
        ( final
            ( default Access_Denied ) // Access_Denied defined above
        )
    )
)
( condition Require_Auth
```

```
( description "Check if server returned the Unauthorized response "
            "code"
  ( assertion
    ( eq http-status-code 401 )
  )
)
( rule Check_Access_Denial
  ( protocol HTTP )
  ( action RESPONSE )
  ( initiator ignore )
  ( target ignore )
  ( prerequisite Host_A_Anon_Access )
  ( outcome
    ( immediate
      ( ifnot Require_Auth Access_Denied )
      ( default ok )   // using built-in disposition
    )
  )
)
```

The example herein above shows that access to, the document sub-tree identified by Some_Url requires the, user be authenticated using basic HTTP authentication. The authentication is accomplished by means of the condition Require_Auth which, in the context of rule Check_Access_Denial, checks that the server returns an Unauthorized status code. If the server fails to do so, the Access_Denied disposition is generated. Note that the prerequisite constraint ensures that the rule Check_Access_Denial is only considered if the rule Host_A_Anon_Access is selected when the HTTP request event is evaluated, that is, requests where basic HTTP authentication is not used.

The Policy Specification Process

In the preferred embodiment the policy specification process comprises the following steps:

1) Identify communicating entities recognized by the security policy. The entities comprise physical networks and sub-networks, host machines, communication protocols, users, applications, services, and any other resources of interest.

2) Identify relationships between the communicating entities and define rules to control said relationships (e.g. host A may communicate with host B but not with host C).

3) Formally define communicating entities and entity relationships using the policy specification language (FIG. 1; 108) according to the invention. In a preferred embodiment a visual tool is used. In another embodiment a text-based editor is used. In the preferred embodiment the output of this step is a policy specification in an advanced encoding format according to the invention.

4) Compile the policy specification with a Policy Compiler (FIG. 1, 106). In one embodiment, said compilation step is incorporated into a graphical policy editor, such that it is incorporated into said policy specification step. In another embodiment it is a distinct step. This step comprises:

a) Checking the specification for errors of syntax or semantics;
  b) Checking the specification of credentials for errors (e.g. credentials that can never be satisfied);
  c) Checking the specification of conditions for errors (e.g. conditions that can never be satisfied);
  d) Checking the specification of rules for completeness and coverage;
  e) Ordering credentials based on their specificity (described in detail herein below);
  f) Ordering rules based on the credentials of their principals (described in detail herein below); and
  g) Resulting in an annotated policy specification (FIG. 1, 109) represented by a text file (FIG. 1 107).

The annotated policy specification 107 is suitable for loading into the Policy Engine 101 for evaluation of one or many network events 103, or back into the graphical policy editor for visualization and further refinement.

Evaluation of Rules

This section describes how policy rules are organized and evaluated according to the invention.

Policy Evaluation Model

The policy specification language 108 alone does not describe how the Policy Engine 101 evaluates policy rules. In the preferred embodiment of the invention, a security administrator that writes the policy specification 107 and the Policy Engine 101 that enforces the policy specification 107 share a common view of the evaluation procedure. The evaluation of policy rules is deterministic.

In the preferred embodiment of the invention the basic policy specification language 108 is augmented to convey information about how rules are ordered for purposes of evaluation, i.e. which rules are evaluated first and which rules are selected for any given network event. The augmented language is a superset of the basic specification language 108 and it is hereinafter referred to as the annotated specification language 109.

In one embodiment the security administrator uses the annotated specification language 109 using a visual tool, such as a graphical policy editor to determine how the policy rules are interrelated, their hierarchical relationships and how they will be evaluated. This step is crucial to determining whether the specified policy correctly reflects the desired security policy and to identifying areas where the policy specification needs refinement.

In the preferred embodiment the Policy Engine 101 uses the annotated language 109 to organize the policy, after having converted it to an internal representation in a manner best suited for the efficient evaluation of network events.

In the preferred embodiment the Policy Engine 101 receives protocol events in proper sequence. Protocol events for protocols lower in the protocol stack are received before protocol events for protocols higher in the stack. This sequencing is important because the Policy Engine 101 must make a policy decision about, for example, a TCP connection, before it makes a decision about an SSL session that uses that TCP connection.

Data about a specific protocol event may not arrive all at once. For example, when evaluating an SSL session the Policy Engine 101 first receives the server certificate and negotiated ciphersuite before receiving a client certificate or a message indicating that none was provided. In a preferred embodiment, the Policy Engine 101 uses incomplete information about a protocol event in order to collect a set of possible policy rules applicable to that event. However, or the sake of simplicity, the remainder of this document assumes that Agents convey information about protocol events in an atomic manner.

In the preferred embodiment for every protocol event the Policy Engine 101 selects a policy rule applicable to that event. Every policy rule is associated with a specific protocol and action or a set of protocols and actions. Therefore only the set of rules relevant to the protocol event is considered. Of that set, several rules can be satisfied by the event. In the preferred embodiment a policy rule is satisfied by a protocol event if the following holds true:

1) The credentials of the Agent 102 reporting the event match the rule's agent credentials (if any), defined as a set of attribute-value assertions.

2) The rule's protocol specifier matches the protocol identifier in the protocol event.

3) The rule's action specifier matches the action identifier in the protocol event.

4) The rule's prerequisite clause is satisfied (details described herein below).

5) The credentials of the initiator 141 and target 142 principals in the protocol event satisfy the rule's corresponding credentials, defined as a set of attribute-value assertions.

In the preferred embodiment when several rules are satisfied by a protocol event, the Policy Engine 101 selects a rule that is most specific to the protocol event. The specificity of a policy rule is determined by the specificity of the credentials associated with the policy rule, as well as the specificity of the rule's protocol, action and prerequisite specifiers. For example, a rule that targets one single protocol is more specific than a rule that targets all protocols. In another example, a rule that specifies a prerequisite is more specific than a rule that does not.

In the preferred embodiment the specificity of a credential specification is determined by the set relationships of said specification with other credential specifications. Following are examples of credential specifications:

A: all principals with blue eyes
B: all principals with blue eyes and black hair
C: all principals with black hair B defines the intersection of A and C, i.e. B is a subset of both A and C. Thus, B is more specific than either A or C.

According to the invention, in general, the more data described about a principal the more specific are the credentials. In the preferred embodiment, some attributes of a principal's credentials have more importance than do other attributes of the credentials. In the preferred embodiment the importance of an attribute is represented by its weight. The attribute weight is determined by its role as a discriminator of principals. For example, an attribute that yields a small set of principals has more weight than an attribute that yields a larger set of principals. In the hair and eye color example herein above, it is arbitrary to give a higher weight to eye color versus hair color or to give both hair and eye color the same weight. Assigning an attribute weight is easier because typically protocol credentials are structured hierarchically. For example, in the TCP protocol, the IP address attribute has clearly more weight than the IP port attribute because the number of principals with a given IP address is generally much smaller than the set of principals with a given port number.

In the preferred embodiment attributes that comprise a set of credentials are ranked by weight and the combined weight of all attributes in a credential specification is considered in determining a relative specificity of said specification.

In the preferred embodiment a policy specification has sets of credentials each of which are ranked at a same specificity level, thereby rendering many policy rules that are applicable to a given protocol event. Herein below is provided a section describing a number of practical guidelines for good policy development that minimize herein above ambiguities.

Figure 5A:
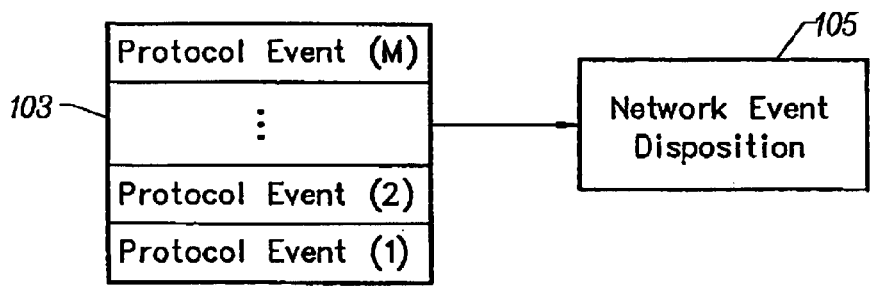
FIG. 5a is a schematic diagram of a network event, comprising protocol events at different protocol layers, having an associated network event disposition according to the invention.

FIG. 5a is a schematic diagram of the preferred embodiment in which a network event 103 comprises M protocol events at different protocol layers, and in which the network event 103 has an associated network event disposition 105.

Figure 5B:
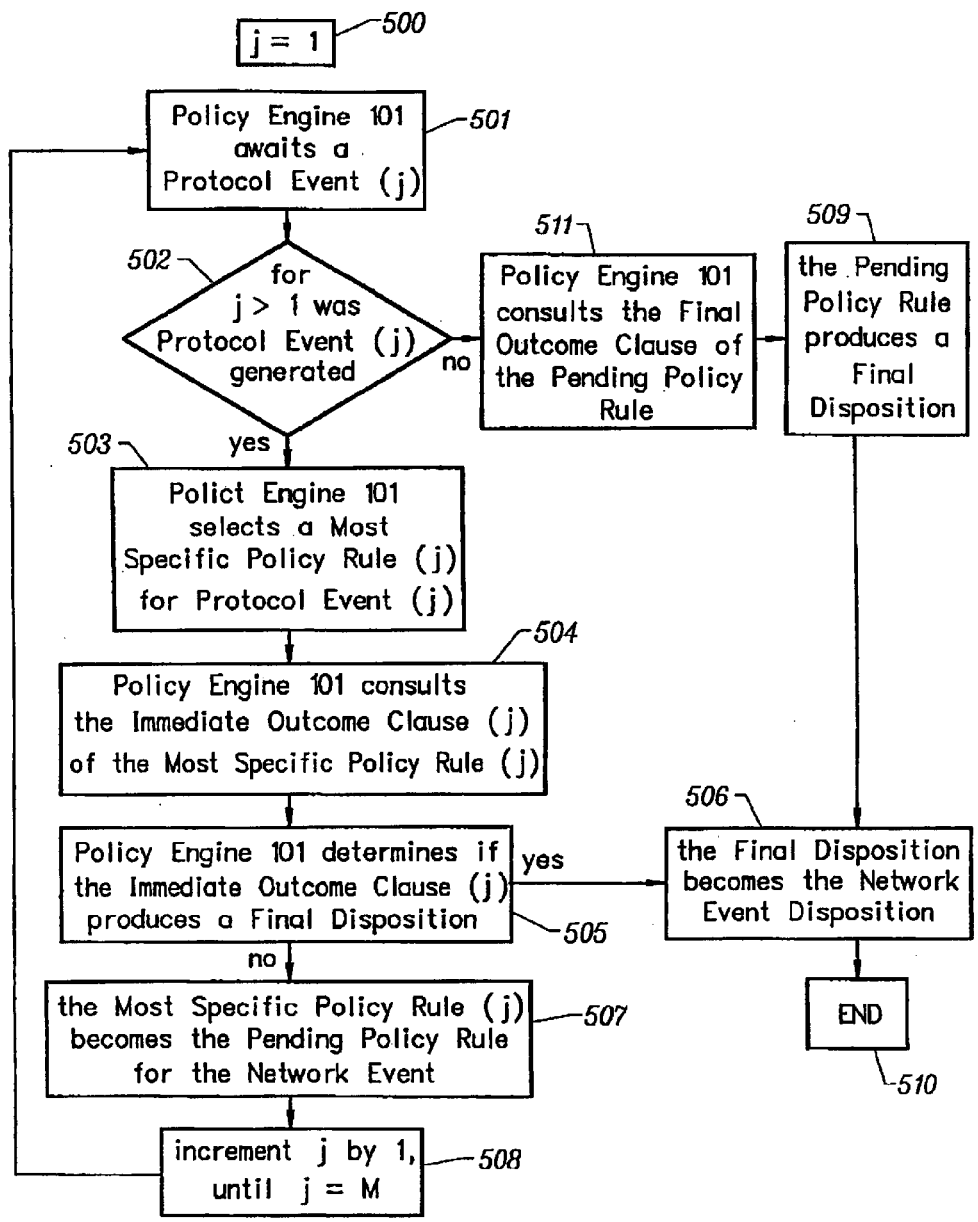
FIG. 5b is an algorithm showing protocol events at different protocol layers resulting in pending rules with or without immediate outcomes and, finally, a final disposition for the network event.

FIG. 5b is an algorithm showing how the M protocol events at different protocol layers of the network event 103 result in pending rules with or without immediate outcomes and, finally, a final disposition for the network event 105. For clarity, the algorithm assumes that the Policy Engine 101 always finds a policy rule applicable to a given protocol event, that at least a first Protocol Event (1) exists, and that the algorithm ends when the Agent 102 informs the Policy Engine 101 that no further protocol events will be generated. These assumptions are for clarifying purposes only and do not limit the invention in any way.

The algorithm begins with j=1 (500) and with the Policy Engine 101 receiving Protocol Event (1) from the Agent 102 (501) (502).

Once a most specific policy rule is selected for a given protocol event (503), the Policy Engine 101 consults an outcome clause (504) determining if an immediate outcome is applied to the protocol event. In the preferred embodiment an immediate outcome applies to a protocol event while a final outcome applies to a network event.

In the preferred embodiment an immediate outcome is executed when it is specified. The immediate outcome can evaluate constraints (i.e. conditions) against a protocol event, produce a set of agent directives (e.g. instructing the Agent 102 to decrypt all subsequent traffic), and produce a final disposition (506) for the protocol event rendering said disposition for the entire network event. When a disposition of an immediate outcome is not a final disposition, a special disposition code, CONTINUE, is used as an indicator. All disposition codes other than CONTINUE denote final dispositions.

In the preferred embodiment when an immediate outcome does not produce a final disposition the associated selected policy rule becomes a pending policy rule for the related network event (507). The Policy Engine 101 then waits for further protocol events of the network event 103 from the Agent 102 (508) and (501). In this embodiment, said pending policy rule is overridden by subsequent policy rule selected for a protocol event higher in the associated protocol stack (507).

In the preferred embodiment policy evaluation ends in one of two cases. First case is when no further rules in the policy apply to a network event (e.g. a highest protocol in the stack is reached). Second case is when the Agent 102 informs the Policy Engine 101 that no further protocol events will be generated (502) (509) (506) (510). In either case, a policy decision is then expected for the entire network event. The Policy Engine 101 selects a pending policy rule for a protocol highest in the protocol stack and executes the final outcome defined for that rule (511). In the preferred embodiment constraints are evaluated against the entire network event. In the preferred embodiment a final outcome always produces a final disposition (509) which becomes a disposition for the network event (506).

In the preferred embodiment a protocol event must result in a selection of a policy rule (pending or final). When a policy rule applicable to a given protocol event is not found, the Policy Engine 101 produces a special disposition identifying a policy specification error. See the default policy rule in Table A.

Ordering of Credentials

In the preferred embodiment credentials are ordered based on a combined weight of all attribute-value assertions that make up a credential specification.

In the preferred embodiment computing a weight of an attribute-value assertion of an attribute requires the following two steps:

1) Assigning a ranking value to the attribute. Attributes that are listed in a credential specification are ranked against each other. Ranking is based on a value of the attribute as a discriminator of principals identified by the credentials. If the presence of the attribute in a credential specification generally yields a smaller set of principals than the presence of another attribute, then the former has a higher ranking than the latter.

2) Assigning a ranking value to an assertion type of the attribute. An assertion type is used to make an assertion about the value of an attribute (e.g. eq, substring, range). Following are five assertion types, in decreasing ranking order:

a) Absent—an assertion not satisfied by any attribute value. The attribute is absent from the presented credentials. In one embodiment said assertion type typically is used to require the absence of an entire set of credentials (e.g. "no SSL client certificate").

d) Single-value—an assertion satisfied by a single attribute value (e.g. "hair color is blue").

e) Multi-value—an assertion satisfied by any value within a set of attribute values (e.g. "port number in the range of 3200 to 4200").

d) Present—an assertion satisfied by any attribute value, wherein the associated attribute must be present in associated presented credentials.

e) Ignore—an assertion always satisfied, irrespective of whether the associated attribute is present or absent from associated presented credentials. This is a "don't care" matching rule.

Table K herein below shows the preferred embodiment assertion types for all operations that operate on attributes to build assertions. In the preferred embodiment when a credential specification does not include any assertions about a particular attribute then the assertion type for that attribute is ignore.

TABLE K

| Operation | Assertion Type |
|---|---|
| absent | Absent |
| eq | Single-value |
| ge | Multi-value |
| gt | Multi-value |
| has | Multi-value |
| ip-mask | Multi-value |
| ip-range | Multi-value |
| le | Multi-value |
| lt | Multi-value |
| member | If the union has a single terminal member, the assertion type is single-value, otherwise it is multi-value |
| prefix | Multi-value |
| present | Present |
| range | Multi-value |
| root | Multi-value |
| substring | Multi-value |

In the preferred embodiment assertions in a credential specification often are combined using logical operators and, or and not. For example,

```
( credential Credentials_Example_1
    ( assertion
        ( and
            ( eq ip-address 207.5.63.8 )
            ( or
```

-continued

```
                ( eq ip-port 80 )
                ( gt ip-port 443 )
            )
        )
    )
)
```

In the preferred embodiment a weight assigned to a credential specification is derived from a combined weight of all assertions the credential specification comprises. An algorithm herein below is used recursively to compute a combined weight of a set of assertions operated on by a logical operator:

A. An operator not does not affect the weight of its operand.

B. An operator and creates a union of weights of all its operands. The weights are sorted in decreasing order of attribute rank. If multiple assertions are made about a particular attribute, use a weight of a most specific assertion and discard all other weights for that attribute. If multiple distinct assertions (i.e. not identical or equivalent) are made about a particular attribute at a same level of specificity, the assertions are enumerated. In general, the higher a number of distinct assertions made about an attribute the more specific is a credential specification. For example, the two assertions "hair is not black" and "hair is not brown" when combined in a union are more specific than either individual assertion.

C. An operator or results in a selection of an operand with a lowest weight. In addition said combined weight is penalized, such that it weighs less than the associated assertion with the lowest weight. If two or more assertions of equal weight are combined with or, the combined weight is lower than that of either or any individual assertion. The rationale behind the penalty is that, in general, combined assertions yield a larger set of principals (i.e. is less specific) than each assertion by itself. The weight penalty is associated with the entire credential specification, not with an individual assertion or set of assertions. Thus, for every instance of the operator or in the credential specification, the weight penalty is incremented by one.

In the preferred embodiment a 3-tuple represents a weight of all attribute-value assertions about a specific attribute within a credential specification. Elements in the 3-tuple are:

Attribute rank

Assertion type rank

Attribute assertion count

In the preferred embodiment the 3-tuple is represented by a weight S-expression in the annotated specification language. A syntax of this expression is:

(weight <attribute><assertion-type><assertion-count>)

In the preferred embodiment ranking of assertion types is fixed and defined by the Table L following:

TABLE L

| Assertion Type | Rank |
|---|---|
| absent | 4 |
| single-value | 3 |
| multi-value | 2 |

TABLE L-continued

| Assertion Type | Rank |
|---|---|
| present | 1 |
| ignore | 0 |

In the preferred embodiment ranking of an attribute is configurable by a security administrator and must be defined prior to a compilation of a policy specification. Attribute ranking is communicated to the policy compiler in a variety of ways. Table M herein below shows a preferred embodiment of proposed rankings for attributes used in credentials for all supported protocols. Said rankings are assumed in examples used throughout the remainder of this document. It is noted that a credential attribute agent-attributes cannot be used in a specification of an initiator or target credential and therefore need not be ranked. It is further noted that the special assertions true and false, which are allowed by the policy specification language's grammar in the preferred embodiment, do not apply to any specific attribute and, thus, are assigned a special weight consisting of a zero valued attribute rank, a zero valued assertion type rank and a zero valued attribute assertion count.

TABLE M

| Protocol/Action | Attribute | Rank |
|---|---|---|
| IP/ASSOCIATION | mac-address | 3 |
| UDP/ASSOCIATION | ip-address | 2 |
| ICMP/ASSOCIATION | ip-port | 1 |
| TCP/CONNECT | | |
| SSL/HANDSHAKE | der-cert | 5 |
| | x509-subject | 4 |
| | x509-issuer | 3 |
| | x509-cert-path | 2 |
| SSL/HANSHAKE | cert-status | 1 |
| HTTP/GET | http-username | 3 |
| HTTP/POST | http-password | 2 |
| HTTP/HEAD | url | 1 |

In the preferred embodiment an attribute assertion count starts at zero for a first assertion and is incremented monotonically for all subsequent assertions. That is, the count enumerates additional assertions for the attribute. In the preferred embodiment the assertion count is omitted from the weight S-expression when said count is zero.

In the preferred embodiment a weight S-expression is omitted when an assertion type is ignore.

In the preferred embodiment the three elements of a 3-tuple are used in sorting a collection of 3-tuples. The attribute rank as a primary key, the assertion type rank as a secondary key, and the attribute assertion count as a tertiary key produce an ordered list of 3-tuples sorted in decreasing order of rank and count. In the preferred embodiment said sorted list is used to rank credential specifications against each other. The sorting algorithm is described using pseudo-code in Table N herein below:

TABLE N

```
Sort_3tuples: subroutine ( 3tuple A, 3tuple B
  begin
    if A.attribute_rank > B.attribute_rank
      return (A is greater than B);
    else if A.attribute_rank < B.attribute_rank
      return (A is less than B);
    else // same attribute rank
      if A.assertion_type > B.assertion_type
```

TABLE N-continued

```
        return (A is greater than B)
      else if A.assertion_type < B.assertion_type
        return (A is less than B) ;
      else // same assertion type
        if A.assertion_count > B.assertion_count
          return (A is greater than B);
        else if A.assertion_count < B.assertion_count
          return (A is less than B);
        else // same assertion count
          return (A is equal to B);
  end
```

A weight penalty is represented by the following S-expression in the annotated specification language:

(weight-penalty <penalty-count>)

where <penalty-count> is an integer representing a number of or operators in a credential specification.

Thus, Credentials_Example_1 herein above is annotated as follows:

(weight ip-address single-value)

(weight ip-port multi-value)

(weight-penalty 1)

In the preferred embodiment a credential specification can combine previous credential specifications with each other or with additional assertions. In the preferred embodiment rules for a combination of assertions with logical operators apply equally to a combination of credential specifications. For example:

```
( credential Credentials_Example_2
  ( assertion
    ( eq ip-address 207.5.63.22
    )
  )
( credential Credentials_Example 3
  ( assertion
    ( and
      Credentials_Example_2
      ( gt ip-port 42 )
    )
  )
)
( credential Credentials_Example_4
  ( assertion
    ( and
      ( or
        Credentials_Example_1
        Credentials_Example_3
      )
      ( lt ip-port 1025 )
    )
  )
)
```

The weight of Credentials_Example_2 is:

(weight ip-address single-value)

The weight of Credentials_Example_3 is:

(weight ip-address single-value)

(weight ip-port multi-value)

In the embodiment to compute the weight of Credentials_Example_4 first compute a weight of the or expression.

Credentials_Example_1 is selected as having a lowest weight because of an associated weight penalty. Furthermore, the or expression in Credentials_Example_4 increases the weight penalty further, yielding:

(weight ip-address single-value)

(weight ip-port multi-value)

(weight-penalty 2)

In the embodiment the and expression add s an additional, distinct, assertion about ip-port. The assertion is of the same type as one currently selected because they are both multi-value assertions. The assertion count for ip-port is incremented, yielding:

(weight ip-address single-value)

(weight ip-port multi-value 1)

(weight-penalty 2)

In the embodiment a ranking algorithm for comparing and ordering credentials is implied in the example previously described herein above. Following in Table O is an associated algorithm using pseudo-code:

TABLE O

```
Rank_credentials: subroutine ( credentials A, credentials B )
  begin
    Let X be a sorted list of 3-tuples that describe the weight of
    credential specification A;
    Let Y be a sorted list of 3-tuples that describe the weight of
    credential specification B;
    // compare 3-tuples
    for all i in X do
      R = Sort_3tuples(X[i],Y[i]);    // defined above
      if R is greater-than
        return (A ranks higher than B)
      else if R is less-than
        return (A ranks lower than B);
      else
        continue;    // 3-tuples are equal
    end
    // X and Y are the same; compare weight penalties
    if A.weight_penalty < B.weight_penalty
      return (A ranks higher than B);
    else if A.weight_penalty > B.weight_penalty
      return (A ranks lower than B);
    else
      return (A and B have the same rank);
  end
```

The following Table P ranks example credentials according to the preferred embodiment using the algorithm herein above. A weight column shows 3-tuples using a format W:x,y,z, wherein x is an integer value for an attribute rank (Table M), y is an integer value for an assertion type (Table P), and z is an assertion count. A weight penalty is shown as P:x, wherein x is a penalty count. It is noted that the higher a rank of a credential specification, the more specific it is. For completeness, the table includes ranking for built-in credentials denoted by absent, present and ignore. Said built-in credentials make assertions about and in the order of an absence, presence, and irrelevance of any credentials presented by a protocol event. It is noted that in the preferred embodiment ignore and present always rank lower and absent higher than do any user-defined credentials.

TABLE P

| Name | Weight | Rank |
|---|---|---|
| absent (built-in) | W:*,5 | 6 |
| Credentials_Example_4 | W:2,3 | 5 |
| | W:1,2,1 | |
| | P:2 | |
| Credentials_Example_3 | W:2,3 | 4 |
| | W:1,2 | |
| Credentials_Example_1 | W:2,3 | 3 |
| | W:1,2 | |
| | P:1 | |
| Credentials_Example_2 | W:2,3 | 2 |
| present (built-in) | W:*,1 | 1 |
| ignore (built-in) | W:*,0 | 0 |

Ordering of Rules

In the preferred embodiment policy rules must be organized such that when two or more rules are satisfied by a protocol event, the most specific rule for that event is selected. The specificity of a policy rule is fully determined by the specificity of the credentials it uses.

In the preferred embodiment policy rules are organized as follows:

1) Rules are segregated by protocol. For example, rules that apply to a TCP protocol are separated from those that apply to a SSL protocol.

2) Within each protocol group, rules are segregated by action. For example, rules that only apply to a TCP CONNECT action are separated from those that only apply to a TCP CLOSE action.

3) Within each protocol-action group, rules are ranked by the specificity of their respective credentials. The ranking algorithm is:

a) Create a 2-tuple from a ranking order of an initiator credential and a target credential. The first element in said 2-tuple is a highest-ranking value and the second element a lowest. That is, said 2-tuple is defined as (MAX(I,T), MIN(I,T)), wherein I and T are the ranking values for the initiator and target credentials, respectively.

b) Sort the rules in increasing ranking order using the first element in the 2-tuple as the primary sorting key and the second element as the secondary key. Rules with identical 2-tuples are given the same ranking number. The rule or rules with the highest-ranking number is the most specific rule for the protocol group.

In the preferred embodiment and because rules are ranked directly from the ranking of their credentials, a special representation is not provided in the annotated specification language for the ranking of the policy rules.

Following is an example using credentials from herein above:

```
( rule Rule_Example_1
  ( protocol TCP )
  ( action CONNECT )
  ( initiator Credentials_Example_2 )      // ranked #2
  ( target Credentials_Example_1 )         // ranked #3
  ( outcome
    ...
  )
)
( rule Rule_Example_2
  ( protocol TCP )
  ( action CONNECT )
  ( initiator Credentials_Example_1 )      // ranked #3
```

```
            ( target Credentials_Example_2 )       // ranked #2
            ( outcome
                ...
            )
        )
        ( rule Rule_Example_3
            ( protocol TCP
            ( action CONNECT
            ( initiator Credentials_Example_2 )    // ranked #2
            ( target Credentials_Example_4 )       // ranked #5
            ( outcome
                ...
            )
        )
```

Table Q herein below shows how said rules are ranked according to the invention.

TABLE Q

| Name | Credentials Rank | Rule Rank |
|---|---|---|
| Rule_Example_3 | (T:5, I:2) | 2 |
| Rule_Example_1 | (T:3, I:2) | 1 |
| Rule_Example_2 | (I:3, T:2) | 1 |

It is noted that Rule_Example_1 and Rule_Example_2 are ranked at the same specificity level. This does not represent a problem because the respective initiator and target credential sets are non-intersecting and used in different roles.

In the preferred embodiment it is possible for two or more rules at a same specificity level to be satisfied by a single protocol event. During policy specification a security administrator disambiguates the evaluation of rules with the same specificity level by forcing a ranking order among them. Forcing a ranking order is done by specifying that one rule is ranked above another rule and is termed forced ranking. Forced ranking is expressed by means of the following S-expression:

(rank-above <rule-name>)

For example, to give Rule_Example_2 precedence over Rule_Example_1, the following S-expression is added to a definition of Rule_Example_2:

(rank-above Rule_Example_1)

In the preferred embodiment after performing the standard ranking algorithm herein above, the Policy Engine 101 evaluates all rank-above expressions and reassigns ranking numbers to each rule accordingly. In the preferred embodiment it is important to note that forced ranking does not force a ranking of an affected rule to a level of a more specific rule higher in the ranking order. Instead a new ranking level is created for the affected rule and all other ranking numbers of more specific rules are incremented accordingly.

For example, Rule_Example_2 herein above is given ranking number 2 and the ranking number of Rule_Example_3 herein above is incremented from 2 to 3.

In the preferred embodiment forced ranking is applied to any rule and is not limited by rules having only non-unique ranking numbers. In this embodiment security administrators are cautioned not to use said forced ranking feature unless absolutely necessary. Its misuse may result in a policy specification that is both difficult to manage and difficult to evaluate. In the preferred embodiment runtime conflicts in the evaluation of rules (i.e. when a protocol event is satisfied by multiple rules) typically can be solved by redesigning credentials upon which said rules are based. Useful tips are provided herein below.

Evaluation Algorithm

In the preferred embodiment the Policy Engine 101 applies a policy evaluation algorithm to each incoming protocol event. The algorithm results in a selection of a policy rule applicable to the protocol event and may produce an immediate or final disposition.

Following is a step-by-step description of the evaluation algorithm according to the preferred embodiment. It is noted that the evaluation procedure described herein below is in conceptual form and does not take into account any possible runtime optimizations:

1) Select a set of rules applicable to an Agent reporting an event;

2) From said set, select a second set of rules applicable to an associated examined protocol.

3) From said second set, select a third set of rules applicable to an associated examined protocol action.

4) Starting with a most specific policy rule in said third set and descending to a least specific rule find a policy rule satisfied by said protocol event. A matching algorithm according to the preferred embodiment is as follows:

a) If one or more orderly listed prerequisite rules are specified, ensure at least one of said prerequisite rules is satisfied by a previously processed protocol event. In the preferred embodiment a prerequisite rule is satisfied if it is a pending policy rule for the protocol event.

b) Match initiator and target credentials in the policy rule against the corresponding initiator and target credentials presented in the protocol event.

5) If a policy rule satisfying the protocol event is not found the Policy Engine 101 generates a disposition for the network event indicating that a policy specification error was encountered. Effectively the processing of the network event thereby terminates.

6) If a policy rule satisfying the protocol event is found, the Policy Engine 101 checks for other rules having a same ranking number and also satisfying the event. If such rules are found the Policy Engine 101 uses the following algorithm in the preferred embodiment to select a single applicable rule:

a) Rules that specify all protocols (i.e. using ignore or present) are less specific than rules that explicitly list a set of one or more protocols.

b) Rules that specify all actions (i.e. using ignore or present) are less specific than rules that explicitly list a set of one or more actions.

c) Rules that have prerequisites are more specific than rules that do not have prerequisites. Rules that specify a higher-ranking prerequisite are more specific than rules that specify a lower-ranking prerequisite. In the preferred embodiment a ranking relationship is relevant only if both prerequisite rules belong to a same protocol-action group.

d) If thereafter a single rule is determined as more specific than the others it is selected for the protocol event. If more than one rule remains the Policy Engine 101 sorts the remaining rules in increasing lexical order by name and selects a first rule from the sorted rules having an immediate disposition indicating in decreasing order of precedence:

i) a policy violation (any disposition code other than OK or CONTINUE);

ii) CONTINUE (allows other rules to examine further the network event); and iii) OK The outcome of the policy evaluation algorithm herein above is a policy rule that satisfies the protocol event. If an immediate outcome is specified for that rule, it is executed, producing a disposition for the protocol event. If the disposition comprises a final disposition code (any code other than CONTINUE), the disposition is also the final disposition for the network event.

Otherwise in the preferred embodiment the selected policy rule is a pending policy rule for the network event. In absence of any further protocol events the pending policy rule is promoted to selected policy rule. A final outcome of the selected policy rule is executed producing a final disposition for the network event.

Policy Specification Guidelines

Provided herein below in Table R are a number of practical guidelines coupled to the preferred embodiment for the development and specification phases of a security policy. Adhering to the guidelines ensures efficient and accurate evaluation of a policy by the Policy Engine 101. It is intended to incorporate the guidelines into a graphical policy editing invention using wizards, policy templates and other UI mechanisms that among other uses simplify and direct the policy specification process.

TABLE R

Rule #1: Work on group relationships

The first step in policy specification is identifying the communicating entities and resources that interact with each other over the network, that is to say, specifying the credentials for both initiator and target principals. Defining groups in relation to each other can significantly enhance the ranking of credentials.
This is best done by:
  Defining all large groups first (e.g. all hosts in the corporate network, all valid certificates).
  Defining all other groups by subsetting larger groups (e.g. all hosts in the marketing subnetwork, all certificates issued by the corporate CA, all revoked certificates).
The process of defining a group as a subset of another can be thought of as
the process of specializing the credentials specification for the larger group. Thus, the smaller group☐s credentials are more specific than those of the larger group. Likewise, creating a larger group through the union of smaller groups generalizes the credentials specification of the smaller groups, thus resulting in less specific credentials for the larger group.
Rule #2: Deny first, allow later A good security management principle is that of denying access to a resource unless access is explicitly granted. Thus, when specifying a network☐s security policy the first step must be to deny access to all target principals via rules that identify initiators via the broadest possible credentials. One can then grant access to each target principal solely to the group of principals to which access should be granted.
For example, to protect a set of host machines from access by all but a small set of principals, one can define a rule that denies access to these machines and whose initiator is denoted by ignore. A second rule allowing access can then be defined. It specifies the same target principal and, as the initiator, a credential specification that describes, in the narrowest possible manner, the principals being granted access. The ranking algorithm guarantees that the rule granting access ranks higher than the rule denying it.
It is crucial that the credential specification for the principals being granted the access privilege be as specific as possible, with all other principals being denied access. This ensures that access is not inadvertently granted to non-privileged principals.
In general, the first policy rule in every protocol layer is one that denies access to all and by all communicating entities (using ignore for both initiator and target principals) for all protocol actions (again using ignore).

TABLE R-continued

Rule #3: Prerequisites are your friends, use them often and use them wisely

Prerequisite rules can play a critical role in the disambiguation of like-ranked rules. Thus, prerequisites should be used whenever possible. In particular, prerequisites should be used in a way that targets each rule to the smallest set of principals possible, and that prevents the repetition of credentials within a set of related rules. For example, if an IP rule exists that defines communication between hosts in two subnets and we want to define a TCP rule affecting the same set of hosts, we should define a TCP rule that takes the aforementioned IP rule as a prerequisite. In addition, the credentials used in the TCP rule should not include assertions that repeat what has already been established by the IP rule (e.g. the IP addresses of the relevant hosts). Instead the TCP rule credentials should specialize (if so desired) the specification of the host credentials, e.g. limiting the host services covered by the rule (i.e. stating the IP ports of interest).
Rule #4: Make dispositions final, unless they are not Immediate outcomes that produce a final disposition should be used whenever possible. In other words, unless one knows that a rule at a given protocol layer may be overridden by a specific rule at a higher protocol layer, the immediate outcome for the former rule should always produce the final disposition for the network event. This prevents a rule☐s outcome from being inadvertently subsumed by another protocol event.
In general, unless a rule is explicitly listed as a prerequisite rule for another rule higher in the protocol stack, its immediate outcome should produce the final disposition for the network event.
Rule #5: If you know the Agent, name it If a policy rule only applies to communications within a specific network segment, restrict the rule☐s scope by specifying the Agent(s) reporting the protocol events for which this rule should be considered.
By doing so, one eliminates that rule from being considered in events reported by other Agents.

Although the invention is described herein with reference to a variety of preferred embodiments, one skilled in the art will readily appreciate that other applications may be substituted for those set forth herein without departing from the spirit and scope of the present invention. Accordingly, the invention should only be limited by the Claims included below.

What is claimed is:

1. A declarative language system for specifying in an annotated policy specification a security policy of a network event, wherein said network event comprises a stack having a plurality of protocol events, wherein each of said plurality of protocol events is associated with a predefined protocol layer, and wherein said network event is an interaction between an active principal and a passive principal, said declarative language system comprising:

a declarative language comprising a plurality of objects, such that each object of said plurality of objects comprises at least one list having a first element;

a declarative language editor for providing means for specifying in a first policy specification said security policy using said declarative language;

a declarative language compiler for providing means for compiling said first policy specification and generating said annotated policy specification;

means for loading said annotated policy specification into a Policy Engine;

means for said Policy Engine to receive said network event from an Agent;

means for said Policy Engine to evaluate said security policy against said network event and to generate a disposition for said network event;

means for said Policy Engine to communicate agent directives to said Agent; and means for said Policy Engine to output said network event and said disposition to a datastore;
wherein said each object is a first-class object and wherein said first-class object is any of:
  a policy;
  a group;
  a credential, said credential having a specificity;
  a condition;
  a disposition; and
  a rule, said rule having an outcome;
wherein said rule for evaluating said event comprises:
  a protocol field associated with said event;
  a plurality of actions associated with said event;
  an initiator for representing said active principal of said event;
  a target for representing said passive principal of said event, and
  means for said outcome to generate a disposition by specifying constraints upon said event said outcome comprising at least one of a plurality of conditional statements and a default statement, wherein each of said plurality of conditional statement comprises a keyword and a disposition, and wherein said plurality of conditional statements are evaluated in chronological order; and
wherein said outcome comprises any of an immediate outcome and a final outcome, wherein said immediate outcome is evaluated by said Policy Engine when said rule is selected, and wherein said final outcome is evaluated when said Policy Engine determines said event is final.

2. A declarative language system for specifying in an annotated policy specification a security policy of a network event, wherein said network event comprises a stack having a plurality of protocol events, wherein each of said plurality of protocol events is associated with a predefined protocol layer, and wherein said network event is an interaction between an active principal and a passive principal, said declarative language system comprising:
  a declarative language comprising a plurality of objects, such that each object of said plurality of objects comprises at least one list having a first element;
  a declarative language editor for providing means for specifying in a first policy specification said security policy using said declarative language;
  a declarative language compiler for providing means for compiling said first policy specification and generating said annotated policy specification;
  means for loading said annotated policy specification into a Policy Engine;
  means for said Policy Engine to receive said network event from an Agent;
  means for said policy Engine to evaluate said security policy against said network event and to generate a disposition for said network event;
  means for said Policy Engine to communicate agent directives to said Agent;
  means for said Policy Engine to output said network event and said disposition to a datastore; and
  an annotated specification language;
wherein said first policy specification further comprises:
  a plurality of credentials,
  a plurality of conditions,
  a plurality of rules;
wherein means for compiling comprises:
  means for checking said first policy specification for syntax errors and semantics errors;
  means for checking said first policy specification for credential errors;
  means for checking said first policy specification for condition errors;
  means for checking said first policy specification for completeness and coverage of said plurality of rules;
  means for ordering said plurality of credentials by using said annotated specification language, whereby for each of said plurality of credentials a credential rank is determined; and
  means for ordering said plurality of rules by using said annotated specification language;
wherein said means for ordering said plurality of credentials further comprises:
  means for computing a combined weight for each of said plurality of credentials of each attribute weight, having a plurality of attribute-value assertions of said plurality of credential attributes, wherein each attribute weight comprises:
    an attribute rank;
    an assertion type rank; and
    an attribute assertion count;
  means for computing a second combined weight of a subset of said plurality of attribute-value assertions operated on by a logical operator;
  means for computing a credential weight penalty for each of said plurality of credentials; and
  means for comparing said plurality of credentials;
wherein said attribute assertion count starts at zero and is incremented monotonically for subsequent assertions.

3. A declarative language system for specifying in an annotated policy specification a security policy of a network event, wherein said network event comprises a stack having a plurality of protocol events, wherein each of said plurality of protocol events is associated with a predefined protocol layer, and wherein said declarative language system comprising:
  a declarative language comprising a plurality of objects, such that each object of said plurality of objects comprises at least one list having a first element;
  a declarative language editor for providing means for specifying in a first policy specification said security policy using said declarative language;
  a declarative language compiler for providing means for compiling said first policy specification and generating said annotated policy specification;
  means for loading said annotated policy specification into a Policy Engine;
  means for said Policy Engine to receive said network event from an Agent;
  means for said Policy Engine to evaluate said security policy against said network event and to generate a disposition for said network event;
  means for said Policy Engine to communicate agent directives to said Agent;
  means for said Policy Engine to output said network event and said disposition to a data store; and
  an annotated specification language;
wherein said first policy specification further comprises:
  a plurality of credentials,
  a plurality of conditions,
  a plurality of rules;
wherein means for compiling comprises:
  means for checking said first policy specification for syntax errors and semantics errors;

means for checking said first policy specification for credential errors;

means for checking said first policy specification for condition errors;

means for checking said first policy specification for completeness and coverage of said plurality of rules;

means for ordering said plurality of credentials by using said annotated specification language, whereby for each of said plurality of credentials a credential rank is determined; and means for ordering said plurality of rules by using said annotated specification language;

wherein said means for ordering said plurality of credentials further comprises:

means for computing a combined weight for each of said plurality of credentials of each attribute weight, having a plurality of attribute-value assertions of said plurality of credential attributes, wherein each attribute weight comprises:

an attribute rank;

an assertion type rank; and an attribute assertion count;

means for computing a second combined weight of a subset of said plurality of attribute-value assertions operated on by a logical operator;

means for computing a credential weight penalty for each of said plurality of credentials; and means for comparing said plurality of credentials; and wherein said assertion count is zero, and said attribute assertion count is omitted from said 3-tuple.

4. A declarative language system for specifying in an annotated policy specification a security policy of a network event, wherein said network event comprises a stack having a plurality of protocol events, wherein each of said plurality of protocol events is associated with a predefined protocol layer, and wherein said network event is an interaction between an active principal and a passive principal, said declarative language system comprising:

a declarative language comprising a plurality of objects, such that each object of said plurality of object comprises at least one list having a first element;

a declarative language editor for providing means for specifying in a first policy specification said security policy using said declarative language;

a declarative language compiler for providing means for compiling said first policy specification and generating said annotated policy specification;

means for loading said annotated policy specification into a Policy Engine;

means for said Policy Engine to receive said network event from an Agent;

means for said Policy Engine to evaluate said security policy against said network event and to generate a disposition for said network event;

means for said Policy Engine to communicate agent directives to said Agent;

means for said Policy Engine to output said network event and said disposition to a datastore; and an annotated specification language;

wherein said first policy specification further comprises:
a plurality of credentials,
a plurality of conditions,
a plurality of rules;

wherein means or compiling comprises:

means for checking said first policy specification for syntax errors and semantics errors;

means for checking said first policy specification for credential errors;

means for checking said first policy specification for condition errors;

means for checking said first policy specification for completeness and coverage of said plurality of rules;

means for ordering said plurality of credentials by using said annotated specification language, whereby for each of said plurality of credentials a credential rank is determined; and means for ordering said plurality of rules by using said annotated specification language;

wherein said means for ordering said plurality credentials further comprises:

means for computing a combined weight for each of said plurality of credentials of each attribute weight, having a Plurality of attribute-value assertions of said plurality of credential attributes, wherein each attribute weight comprises:

an attribute rank;

an assertion type rank; and an attribute assertion count;

means for computing a second combined weight of a subset of said plurality of attribute-value assertions operated on by a logical operator;

means for computing a credential weight penalty for each of said plurality of credentials; and means for comparing said plurality of credentials;

wherein said attribute weight is represented by a 3-tuple having a weight keyword in said annotated specification language; and further comprising means to sort a plurality of 3-tuples, wherein said attribute rank is a primary key, said assertion type rank is a secondary key, and said attribute assertion count is a tertiary key, thereby providing a sorted list.

5. A declarative language system for specifying in an annotated policy specification a security policy of a network event, wherein said network event comprises a stack having a plurality of protocol events, wherein each of said plurality of protocol events is associated with a predefined protocol layer, and wherein said network event is an interaction between an active principal and a passive principal, said declarative language system comprising:

a declarative language comprising a plurality of objects, such that each object of said plurality of objects comprises at least one list having a first element;

a declarative language editor for providing means for specifying in a first policy specification said security policy using said declarative language;

a declarative language compiler for providing means for compiling said first policy specification and generating said annotated policy specification;

means for loading said annotated policy specification into a Policy Engine;

means for said Policy Engine to receive said network event from an Agent;

means for said Policy Engine to evaluate said security policy against said network event and to generate a disposition for said network event;

means for said Policy Engine to communicate agent directives to said Agent;

means for said Policy Engine to output said network event and said disposition to a datastore; and an annotated specification language;

47 wherein said first policy specification further comprises:
   a plurality of credentials,
   a plurality of conditions,
   a plurality of rules;
wherein means far compiling comprises:
   means for checking said first policy specification for syntax errors and semantics errors;
   means for checking said first policy specification for credential errors;
   means for checking said first policy specification for condition errors;
   means for checking said first policy specification for completeness and coverage of said plurality at rules;
   means for ordering said plurality of credentials by using said annotated specification language, whereby for each of said plurality of credentials a credential rank is determined; and
   means for ordering said plurality of rules by using said annotated specification language;
wherein said means for ordering said plurality of credentials further comprises:
   means for computing a combined weight for each of plurality of credentials of each attribute weight, having a plurality of attribute-value assertions of said plurality of credential attributes, wherein each attribute weight comprises:
      an attribute rank;
      an assertion type rank; and
      an attribute assertion count;
   means for computing a second combined weight of a subset of said plurality of attribute-value assertions operated on by a logical operator;
   means for computing a credential weight penalty for each of said plurality of credentials; and
   means for comparing said plurality of credentials;
wherein said attribute weight is represented by a 3-tuple having a weight keyword in said annotated specification language; and
wherein means for computing a weight penalty comprises:
   a weight-penalty keyword in said annotated specification language having a penalty-count parameter, wherein said penalty-count parameter is an integer representing a total number of occurrences of logical operator or in each credential.

6. A declarative language system for specifying in an annotated policy specification a security policy of a network event, wherein said network event comprises a stack having a plurality of protocol events, wherein each of said plurality of protocol events is associated with a predefined protocol layer, and wherein said network event is an interaction between an active principal and a passive principal, said declarative language system comprising:
   a declarative language comprising a plurality of objects, such that each object of said plurality of objects comprises at least one list having a first element;
   a declarative language editor for providing means for specifying in a first policy specification said security policy using said declarative language;
   a declarative language compiler for providing means for compiling said first policy specification and generating said annotated policy specification;
   means for loading said annotated policy specification into a Policy Engine;
   means for said Policy Engine to receive said network event from an Agent;

48 means for said Policy Engine to evaluate said security policy against said network event and to generate a disposition for said network event;
   means for said Policy Engine to communicate agent directives to said Agent;
   means for said Policy Engine to output said network event and said disposition to a datastore; and
   an annotated specification language;
wherein said first policy specification further comprises:
   a plurality of credentials,
   a plurality of conditions,
   a plurality of rules;
wherein means for compiling comprises:
   means for checking said first policy specification for syntax errors and semantics errors;
   means for checking said first policy specification for credential errors;
   means for checking said first policy specification for condition errors;
   means for checking said first policy specification for completeness and coverage of said plurality of rules;
   means for ordering said plurality of credentials by using said annotated specification language, whereby for each of plurality of credentials a credential rank is determined; and
   means for ordering said plurality of rules by using said annotated specification language;
wherein said means for ordering said plurality of credentials further comprises:
   means for computing a combined weight for each of sail plurality of credentials of each attribute weight, having a plurality of attribute-value assertions of said plurality of credential attributes, wherein each attribute weight comprises:
      an attribute rank;
      an assertion type rank; and
      an attribute assertion count;
   means for computing a second combined weight of a subset of said plurality of attribute-value assertions operated on by a logical operator;
   means for computing a credential weight penalty for each of said plurality of credentials; and
   means for comparing said plurality of credentials;
wherein means for comparing said plurality of credentials comprises:
   means to determine a highest ranking 3-tuple from said sorted 3-tuples;
   means to compare credential weight penalties; and
   means to assign said credential rank.

7. A declarative language system for specifying in a annotated policy specification a security policy of a network event, wherein said network event comprises a stack having a plurality of protocol events, wherein each of said plurality of protocol events is associated with a predefined protocol layer, and wherein said network event is an interaction between an active principal and passive principal, said declarative language system comprising:
   a declarative language comprising a plurality of objects, such that each object of said plurality of objects comprises at least one list having a first element;
   a declarative language editor for providing means for specifying in a first policy specification said security policy using said declarative language;
   a declarative language compiler for providing means for compiling said first policy specification and generating said annotated policy specification;

means for loading said annotated policy specification into a Policy Engine;

means for said Policy Engine to receive said network event from an Agent;

means for said Policy Engine to evaluate said security policy against said network event and to generate a disposition for said network event;

means for said Policy Engine to communicate agent directives to said Agent;

means for said Policy Engine to output said network event and said disposition to a datastore; and an annotated specification language;

wherein said first policy specification further comprises:
  a plurality of credentials,
  a plurality of conditions, and
  a plurality of rules;

wherein means for compiling comprises:
  means for checking said first policy specification for syntax errors and semantics errors;
  means for checking said first policy specification for credential errors;
  means for checking said first policy specification for condition errors;
  means for checking said first policy specification for completeness and coverage of said plurality of rules;
  means for ordering said plurality of credentials by using said annotated specification language, whereby for each of said plurality of credentials a credential rank is determined; and
  means for ordering said plurality of rules by using said annotated specification language;

wherein means for ordering said plurality of rules comprises:
  a plurality of predetermined protocols;
  a plurality of predetermined protocol-action groups;
  means to assign each of said rules to one of said predetermined protocols;
  means to assign each of said rules to one of said predetermined protocol-action groups;
  means to rank each of said rules in said predetermined protocol-action groups by using said credential ranking value for said target credential of said rule and by using said credential ranking value for said initiator credential of said rule; and
  means to sort in increasing order each of said ranked rules in said predetermined protocol-action groups; and
  means to force said rule ranking value for any of each of said rules using said annotated specification language, said annotated specification language having a rank-above expression having a rule-name parameter;

wherein means to force said rule ranking value comprises:
  generating a new ranking level for said forced ranked rule, whereby each of said rules having a rule ranking level at forced level or higher are incremented.

8. A method for evaluating a policy using a plurality of policy rules, each rule having a ranking and a disposition, to a protocol event reported by an Agent, said protocol event having a protocol, a protocol action, a target credential, and an initiator credential, comprising the steps of:

selecting a first set of rules from said plurality of policy rules, such that each rule is associated with said Agent;

selecting a second set of rules from said first set of rules, such that each rule is associated with said protocol from said event;

selecting a third set of rules from said second set of rules, such that each rule is associated with said protocol action from said event;

searching for a most specific policy rule from said third set, such that said most specific policy rule is satisfied by said protocol event and generating an error disposition when said most specific policy rule is undetermined;

checking said third set of rules for a fourth set of rules having same said ranking as said selected most specific policy rule; and providing means to select a single applicable rule from said fourth set of rules;

wherein the step of providing means to select a single applicable rule further comprises the steps of:
  designating any rule of said fourth set of rules that specifies all of said plurality of protocols as less specific;
  designating any rule of said fourth set of rules that specifies all of said plurality of protocol actions as less specific;
  designating any rule of said fourth set of rules having prerequisite rules as more specific, wherein a rule having a higher ranking prerequisite is more specific than a rule having a lower ranking prerequisite;
  sorting any remaining rules in increasing lexical order by said names and thereafter by said immediate dispositions in decreasing order of precedence; and
  selecting said single applicable rule from first rule of said sorted rules.

9. A method for evaluating a policy using a plurality of policy rules, each rule having a ranking and a disposition, to a protocol event reported by an Agent, said protocol event having a protocol, a protocol action, a target credential, and an initiator credential, comprising the steps of:

selecting a first set of rules from plurality of policy rules, such that each rule is associated with said Agent;

selecting a second set of rules from said first set of rules, such that each rule is associated with said protocol from said event;

selecting a third set of rules from said second set of rules, such that each rule is associated with said protocol action from said event;

searching for a most specific policy rule from said third set, such that said most specific policy rule is satisfied by said protocol event and generating an error disposition when said most specific policy rule is undetermined;

checking said third set of rules for a fourth set of rules having same said ranking as said selected most specific policy rule; and providing means to select a single applicable rule from said fourth set of rules;

wherein the step of providing means to select a single applicable rule further comprises the steps of:
  designating any rule of said fourth set of rules that specifies all of said plurality of protocol as less specific;
  designating any rule of said fourth set of rules that specifies all of said plurality of protocol actions as less specific;

designating any rule of said fourth set of rules having prerequisite rules as more specific, wherein a rule having a higher ranking prerequisite is more specific than a rule having a lower ranking prerequisite;

sorting any remaining rules in increasing lexical order by said names and thereafter by said immediate dispositions in decreasing order of precedence; and selecting said single applicable rule from first rule of said sorted rules; and wherein said immediate dispositions in decreasing order of precedence comprises:

a policy violation;

CONTINUE; and

OK.

* * * * *